(12) United States Patent
Jia et al.

(10) Patent No.: US 11,789,604 B2
(45) Date of Patent: Oct. 17, 2023

(54) HANDWRITING PROCESSING METHOD, HANDWRITING PROCESSING DEVICE AND NON-TRANSITORY STORAGE MEDIUM

(71) Applicant: BOE TECHNOLOGY GROUP CO., LTD., Beijing (CN)

(72) Inventors: Honghong Jia, Beijing (CN); Fengshuo Hu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 43 days.

(21) Appl. No.: 17/763,704

(22) PCT Filed: Mar. 12, 2021

(86) PCT No.: PCT/CN2021/080493
§ 371 (c)(1),
(2) Date: Mar. 25, 2022

(87) PCT Pub. No.: WO2021/218446
PCT Pub. Date: Nov. 4, 2021

(65) Prior Publication Data
US 2022/0365670 A1 Nov. 17, 2022

(30) Foreign Application Priority Data
Apr. 30, 2020 (CN) .......................... 202010363753.4

(51) Int. Cl.
G06F 3/04883 (2022.01)
G06F 3/0354 (2013.01)
G06F 18/2411 (2023.01)

(52) U.S. Cl.
CPC ...... *G06F 3/04883* (2013.01); *G06F 3/03545* (2013.01); *G06F 18/2411* (2023.01)

(58) Field of Classification Search
CPC ............. G06F 3/03545; G06F 3/04883; G06F 18/2411
See application file for complete search history.

(56) References Cited

U.S. PATENT DOCUMENTS 9,430,065 B2 * 8/2016 Petkov ............... G06V 30/1423
9,448,648 B2 * 9/2016 Angelov ............... G06F 3/0412
(Continued)

FOREIGN PATENT DOCUMENTS

CN 105405159 A 3/2016
CN 106293232 A 1/2017
(Continued)

*Primary Examiner* — Michael Pervan
(74) *Attorney, Agent, or Firm* — Chiwin Law LLC

(57) ABSTRACT

A handwriting processing method, a handwriting processing device and a non-transitory storage medium. The handwriting processing method includes: acquiring a handwriting point group corresponding to a stroke on a working surface of a touch device, the handwriting point group including a plurality of handwriting points arranged in sequence, and data of each handwriting point in the plurality of handwriting points including a coordinate and an action type, determining a plurality of model patterns corresponding to the plurality of handwriting plurality of model patterns being in one-to-one correspondence with the plurality of handwriting points; and sequentially connecting the plurality of model patterns, to determine a handwriting track for displaying corresponding to the handwriting point group.

20 Claims, 5 Drawing Sheets

(56) References Cited

U.S. PATENT DOCUMENTS

| | | | | |
|---|---|---|---|---|
| 9,766,804 B2* | 9/2017 | Angelov | | G06F 3/0412 |
| 9,875,021 B2* | 1/2018 | Petkov | | G06F 3/038 |
| 9,904,465 B2* | 2/2018 | Angelov | | G06F 3/04883 |
| 9,904,466 B2* | 2/2018 | Angelov | | G06T 11/203 |
| 10,078,445 B2* | 9/2018 | Petkov | | G06F 3/04883 |
| 10,191,653 B2* | 1/2019 | Angelov | | G06Q 10/101 |
| 10,331,338 B2* | 6/2019 | Petkov | | G06F 3/044 |
| 10,409,484 B2* | 9/2019 | Angelov | | G06F 3/03545 |
| 10,534,530 B2* | 1/2020 | Angelov | | G06F 3/04883 |
| 10,768,805 B2* | 9/2020 | Angelov | | G06F 3/03545 |
| 11,023,127 B2* | 6/2021 | Petkov | | G06F 3/0447 |
| 11,042,292 B2* | 6/2021 | Angelov | | G06F 3/0346 |
| 11,169,696 B2* | 11/2021 | Angelov | | G06F 3/038 |
| 11,188,223 B2* | 11/2021 | Angelov | | G06F 3/0354 |
| 2015/0371417 A1* | 12/2015 | Angelov | | G06V 30/347 |
| | | | | 345/442 |
| 2015/0378450 A1* | 12/2015 | Petkov | | G06T 11/203 |
| | | | | 345/442 |
| 2016/0224239 A1* | 8/2016 | Angelov | | G06F 3/038 |
| 2016/0253090 A1* | 9/2016 | Angelov | | G06F 3/0346 |
| | | | | 715/863 |
| 2016/0328145 A1* | 11/2016 | Petkov | | G06Q 10/101 |
| 2016/0328624 A1* | 11/2016 | Angelov | | G06F 3/044 |
| 2016/0328625 A1* | 11/2016 | Angelov | | G06F 3/04883 |
| 2018/0004407 A1* | 1/2018 | Angelov | | G06F 3/0412 |
| 2018/0101299 A1* | 4/2018 | Petkov | | G06T 11/203 |
| 2018/0203599 A1* | 7/2018 | Angelov | | G06F 3/0412 |
| 2019/0050143 A1* | 2/2019 | Petkov | | G06T 11/203 |
| 2019/0155498 A1* | 5/2019 | Angelov | | G06F 3/0412 |
| 2019/0310769 A1* | 10/2019 | Petkov | | G06F 3/0447 |
| 2020/0019306 A1* | 1/2020 | Angelov | | G06F 3/0412 |
| 2020/0167069 A1* | 5/2020 | Angelov | | G06V 30/347 |
| 2020/0401306 A1* | 12/2020 | Angelov | | G06F 3/044 |
| 2022/0164100 A1* | 5/2022 | Angelov | | G06Q 10/101 |

FOREIGN PATENT DOCUMENTS

| | | |
|---|---|---|
| CN | 107798717 A | 3/2018 |
| CN | 110321054 A | 10/2019 |
| CN | 110531875 A | 12/2019 |

* cited by examiner

HANDWRITING PROCESSING METHOD, HANDWRITING PROCESSING DEVICE AND NON-TRANSITORY STORAGE MEDIUM

CROSS-REFERENCE TO RELATED APPLICATION

The present application claims priority of Chinese Patent Application No. 202010363753.4, filed on Apr. 30, 2020, and the entire content disclosed by the Chinese patent application is incorporated herein by reference as part of the present application for all purposes.

TECHNICAL FIELD

The embodiments of the present disclosure relate to a handwriting processing method, a handwriting processing device and a non-transitory storage medium.

BACKGROUND

With the rapid development of information technology, the technology of handwritten inputting by holding a pen or a finger on an intelligent interactive tablet is becoming more and more mature, and the requirements of users for handwriting effect are getting higher and higher. Users not only hope that the handwriting input by handwritten inputting can be recognized, but also hope that handwriting can be beautiful and have the better stroke effect.

SUMMARY

At least one embodiment of the present disclosure provides a handwriting processing method, the handwriting processing method comprises: acquiring a handwriting point group corresponding to a stroke on a working surface of a touch device, wherein the handwriting point group comprises a plurality of handwriting points arranged in sequence, and data of each handwriting point in the plurality of handwriting points comprises a coordinate and an action type; determining a plurality of model patterns corresponding to the plurality of handwriting points based on the coordinates and the action types of the plurality of handwriting points, wherein the plurality of model patterns are in one-to-one correspondence with the plurality of handwriting points; and sequentially connecting the plurality of model patterns, to determine a handwriting track for displaying corresponding to the handwriting point group.

For example, in the handwriting processing method provided by at some embodiments of the present disclosure, the determining the plurality of model patterns corresponding to the plurality of handwriting points based on the coordinates and the action types of the plurality of handwriting points comprises: in response to an action type of a first handwriting point among the plurality of handwriting points being a writing-beginning type, according to a corresponding basic line width in a writing process and a coordinate of the first handwriting point in a writing application, determining a size and a central coordinate of a model pattern corresponding to the first handwriting point.

For example, in the handwriting processing method provided by at some embodiments of the present disclosure, the determining the plurality of model patterns corresponding to the plurality of handwriting points based on the coordinates and the action types of the plurality of handwriting points further comprises:

in response to the action type of the first handwriting point being the writing-beginning type, determining a writing-beginning stroke type corresponding to the handwriting point group, based on the writing-beginning stroke type and the model pattern corresponding to the first handwriting point, determining a size and a central coordinate of an auxiliary model pattern corresponding to the first handwriting point, and based on the model pattern and the auxiliary model pattern corresponding to the first handwriting point, determining an auxiliary quadrangle corresponding to the first handwriting point, wherein the auxiliary quadrangle corresponding to the first handwriting point is used for connecting the model pattern and the auxiliary model pattern corresponding to the first handwriting point.

For example, in the handwriting processing method provided by at some embodiments of the present disclosure, the determining the writing-beginning stroke type corresponding to the handwriting point group comprises: determining a t-th handwriting point among the plurality of handwriting points, wherein t is a positive integer, $t \neq 1$, and a coordinate of the t-th handwriting point is different from the coordinate of the first handwriting point; and based on the coordinate of the first handwriting point and the coordinate of the t-th handwriting point, determining the writing-beginning stroke type corresponding to the handwriting point group.

For example, in the handwriting processing method provided by at some embodiments of the present disclosure, the coordinate of the first handwriting point is (x1, y1), the coordinate of the t-th handwriting point is (x2, y2), $dx = x2 - x1$, $dy = y2 - y1$, based on the coordinate of the first handwriting point and the coordinate of the t-th handwriting point, determining the writing-beginning stroke type corresponding to the handwriting point group comprises:

in response to $dx=0$ and $dy \neq 0$, determining that the writing-beginning stroke type corresponding to the handwriting point group is a horizontal stroke, in response to $dx \neq 0$ and $dy=0$, determining that the writing-beginning stroke type corresponding to the handwriting point group is a vertical stroke, in response to $dx \neq 0$ and $dy \neq 0$:

in a case where $dx>0$ and $0 \leq |dy/dx| \leq 0.27$, determining that the writing-beginning stroke type corresponding to the handwriting point group is a horizontal stroke, in a case where $dy>0$ and $0 \leq |dx/dy| \leq 0.27$, determining that the writing-beginning stroke type corresponding to the handwriting point group is a vertical stroke, in a case where $dx<0$, $dy>0$ and $0.27<|dy/dx| \leq 3.73$, determining that the writing-beginning stroke type corresponding to the handwriting point group is a left-falling stroke, in a case where $dx>0$, $dy>0$ and $0.27<|dy/dx| \leq 3.73$, determining that the writing-beginning stroke type corresponding to the handwriting point group is a right-falling stroke, in a case where $dx>0$, $dy<0$ and $0.27<|dy/dx| \leq 3.73$, determining that the writing-beginning stroke type corresponding to the handwriting point group is a rising stroke, and in a case where $dx<0$ and $dy<0$, determining that the writing-beginning stroke type corresponding to the handwriting point group is other types.

For example, in the handwriting processing method provided by at some embodiments of the present disclosure, based on the writing-beginning stroke type and the model pattern corresponding to the first handwriting point, determining the size and the central coordinate of the auxiliary model pattern corresponding to the first handwriting point comprises: in a case where the writing-beginning stroke type is the horizontal stroke, setting the size and the central coordinate of the auxiliary model pattern so that r=R/2, $O_1O_2$=w/2, α=57°~63°; in a case where the writing-beginning stroke type is the vertical stroke, setting the size and the central coordinate of the auxiliary model pattern so that r=R/1.5, $O_1O_2$=w/1.5, α=67°~73°; in a case where the writing-beginning stroke type is the left-falling stroke or the rising stroke, setting the size and the central coordinate of the auxiliary model pattern so that r=R/2, $O_1O_2$=w/2, =α=42°~48°; in a case where the writing-beginning stroke type is the right-falling stroke or the other types, setting the size and the central coordinate of the auxiliary model pattern so that r=R/1.5, $O_1O_2$=w/1.5, α=7°~13°, where R represents the size of the model pattern corresponding to the first handwriting point, $O_1$ represents a center of the model pattern corresponding to the first handwriting point, r represents the size of the auxiliary model pattern corresponding to the first handwriting point, $O_2$ represents a center of the auxiliary model pattern corresponding to the first handwriting point, $O_1O_2$ represents a distance of a central connection line between the model pattern and the auxiliary model pattern corresponding to the first handwriting point, and w represents a basic line width, α represents an included angle between the central connection line and a horizontal line.

For example, in the handwriting processing method provided by at some embodiments of the present disclosure, the determining the plurality of model patterns corresponding to the plurality of handwriting points based on the coordinates and the action types of the plurality of handwriting points further comprises: in response to the action type of the first handwriting point being a writing-beginning type, according to the basic line width and a coordinate of a second handwriting point among the plurality of handwriting points, determining a size and a central coordinate of a model pattern corresponding to the second handwriting point, and the first handwriting point is adjacent to the second handwriting point.

For example, in the handwriting processing method provided by at some embodiments of the present disclosure, the determining the plurality of model patterns corresponding to the plurality of handwriting points based on the coordinates and the action types of the plurality of handwriting points comprises: in response to an action type of a first handwriting point among the plurality of handwriting points being a pen-move type, according to a previous handwriting point group of the handwriting point group, determining a size of a model pattern corresponding to the first handwriting point among the plurality of handwriting points and a size of a model pattern corresponding to a second handwriting point among the plurality of handwriting points, determining a central coordinate of the model pattern corresponding to the first handwriting point according to the coordinate of the first handwriting point, and determining a central coordinate of the model pattern corresponding to the second handwriting point according to the coordinate of the second handwriting point.

For example, in the handwriting processing method provided by at some embodiments of the present disclosure, according to the previous handwriting point group of the handwriting point group, determining the size of the model pattern corresponding to the first handwriting point among the plurality of handwriting points and the size of the model pattern corresponding to the second handwriting point among the plurality of handwriting points comprises: in response to a coordinate of an N-th handwriting point of the previous handwriting point group being identical to the coordinate of the first handwriting point of the handwriting point group, taking a size of a model pattern corresponding to the N-th handwriting point of the previous handwriting point group as the size of the model pattern corresponding to the first handwriting point of the handwriting point group, and determining a third distance between the second handwriting point and the first handwriting point of the handwriting point group and a fourth distance between the N-th handwriting point and an (N−1)-th handwriting point of the previous handwriting point group, and according to the basic line width, the size of the model pattern corresponding to the first handwriting point of the handwriting point group, the third distance and the fourth distance, determining the size of the model pattern corresponding to the second handwriting point of the handwriting point group, and the N-th handwriting point and the (N−1)-th handwriting point of the previous handwriting point group are the last two handwriting points of the previous handwriting point group.

For example, in the handwriting processing method provided by at some embodiments of the present disclosure, the determining the plurality of model patterns corresponding to the plurality of handwriting points based on the coordinates and the action types of the plurality of handwriting points further comprises: starting from an i-th handwriting point among the plurality of handwriting points, determining a first distance between the i-th handwriting point and an (i−1)-th handwriting point and a second distance between the (i−1)-th handwriting point and an (i−2)-th handwriting point, and according to the basic line width, a size of a model pattern corresponding to the (i−1)-th handwriting point, the first distance and the second distance, determining the size of the model pattern corresponding to the i-th handwriting point; and determining a central coordinate of the model pattern corresponding to the i-th handwriting point according to a coordinate of the i-th handwriting point, where i is a positive integer, and i≥3.

For example, in the handwriting processing method provided by at some embodiments of the present disclosure, an M-th handwriting point of the plurality of handwriting points is a last handwriting point of the handwriting point group, determining the plurality of model patterns corresponding to the plurality of handwriting points based on the coordinates and the action types of the plurality of handwriting points comprises: in response to an action type of the M-th handwriting point being a writing-ending type, determining a writing-beginning stroke type corresponding to the handwriting point group, and according to the writing-beginning stroke type, setting a size of each of a plurality of model patterns corresponding to an (M−j)-th handwriting point to the M-th handwriting point among the plurality of handwriting points, where j is a positive integer and j≥1.

For example, in the handwriting processing method provided by at some embodiments of the present disclosure, the writing-beginning stroke type comprises a horizontal stroke, a vertical stroke, a left-falling stroke, a right-falling stroke, a rising stroke and other types, according to the writing-beginning stroke type, the setting the size of each of the plurality of model patterns corresponding to the (M−j)-th handwriting point to the M-th handwriting point among the plurality of handwriting points comprises: in a case where the writing-beginning stroke type is the horizontal stroke or the right-falling stroke, sequentially increasing the sizes of the plurality of model patterns corresponding to the (M−j)-th handwriting point to the M-th handwriting point according to a first preset proportion; in a case where the writing-beginning stroke type is the vertical stroke, the left-falling stroke or the rising stroke, sequentially reducing the sizes of the plurality of model patterns corresponding to the (M−j)-th handwriting point to the M-th handwriting point according to a second preset proportion; and in a case where the writing-beginning stroke type is other type, setting the sizes of the plurality of model patterns corresponding to the (M−j)-th handwriting point to the M-th handwriting point among the plurality of handwriting points not according to the writing-beginning stroke type.

For example, in the handwriting processing method provided by at some embodiments of the present disclosure, the model pattern corresponding to each handwriting point of the handwriting point group comprises a circle or an ellipse, sequentially connecting the plurality of model patterns, to determine the handwriting track for displaying corresponding to the handwriting point group comprises: sequentially connecting four outer common tangent points of model patterns corresponding to every two adjacent handwriting points among the plurality of handwriting points, to form a quadrangle between the every two adjacent handwriting points, wherein the quadrangle between the every two adjacent handwriting points is used for connecting the model patterns corresponding to the every two adjacent handwriting points.

For example, in the handwriting processing method provided by at some embodiments of the present disclosure, the acquiring the handwriting point group corresponding to the stroke on the working surface of the touch device comprises: sampling the stroke on the working surface of the touch device, to obtain a plurality of sampling points; and based on the plurality of sampling points, performing interpolation by adopting a Bezier curve fitting algorithm, to obtain a plurality of interpolation points, and the plurality of handwriting points of the handwriting point group comprise the plurality of sampling points and the plurality of interpolation points, and the action type of each sampling point in the plurality of sampling points is one of a set consisting of a writing-beginning type, a pen-move type and a writing-ending type.

For example, in the handwriting processing method provided by at some embodiments of the present disclosure, the stroke corresponds to a plurality of handwriting point groups, an action type of a first handwriting point of a first handwriting point group in the plurality of handwriting point groups is a writing-beginning type, and an action type of a last handwriting point of a last handwriting point group in the plurality of handwriting point groups is a writing-ending type.

For example, in the handwriting processing method provided by at some embodiments of the present disclosure, a stroke type of the handwriting track for displaying is a brush stroke.

At least one embodiment of the present disclosure provides a handwriting processing device, the handwriting processing device comprises: a memory, storing computer-readable instructions in a non-transitory manner; and a processor, running the computer-readable instructions, and in a case where the computer-readable instructions are run by the processor, the handwriting processing method according to any embodiment of the present disclosure is executed.

For example, the handwriting processing device provided by some embodiments of the present disclosure further comprises a touch device, and the touch device is configured to acquire the handwriting point group corresponding to the stroke on the working surface of the touch device.

For example, the handwriting processing device provided by some embodiments of the present disclosure further comprises a display device, the display device is configured to display the handwriting track for displaying corresponding to the handwriting point group.

At least one embodiment of the present disclosure provides a non-transitory storage medium, the non-transitory storage medium stores computer-readable instructions non-transiently, and in a case where the computer-readable instructions, which is stored non-transiently, are executed by a computer, instructions of the handwriting processing method according to any embodiment of the present disclosure are executed.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
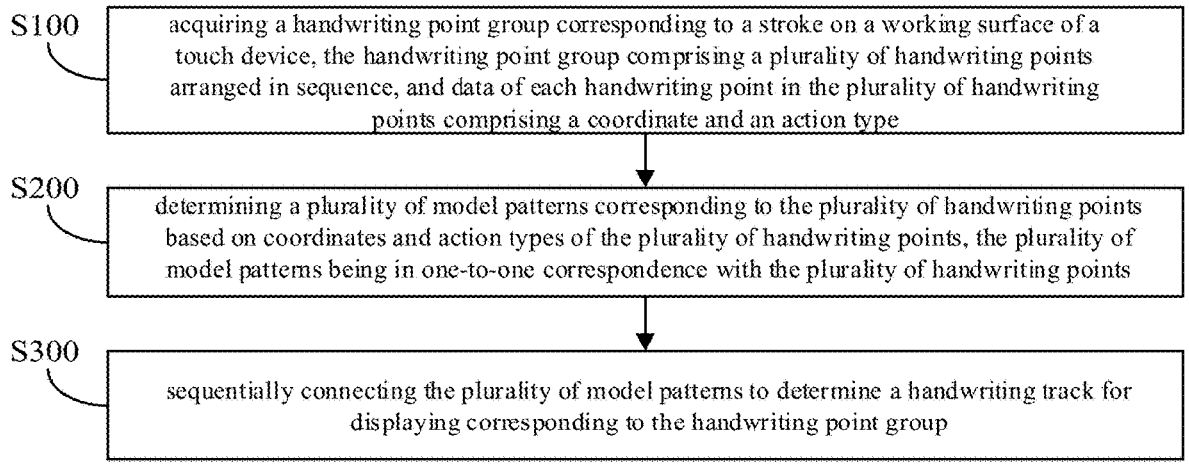
FIG. 1 is a schematic flow chart of a handwriting processing method provided by at least one embodiment of the present disclosure.

In order to make objects, technical solutions and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly. In order to keep the following description of the embodiments of the present disclosure clear and concise, detailed descriptions of some known functions and components are omitted in the present disclosure.

In the fields of education, office and medical care, electronic interactive whiteboard, as a convenient tool, plays an extremely important role in an interaction and sharing of information. However, a processing speed and handwriting processing effect of the electronic interactive whiteboard restrict the user experience of the product. At present, the method to realize the brush stroke effect of the non-pressure handwritten inputting is usually complicated, it takes a lot of calculations to output a stroke with the stroke effect, high computing resources of hardware are required, and the real-time capability is inadequate, so it is difficult for users to get a carefree experience of the handwritten inputting.

Moreover, in recent years, with the technological progress of smart devices, such as tablet computers and smart phones, the users have higher and higher requirements for a handwritten function. However, because the writing experience on the screen of the smart device is different from the writing experience on an actual paper, and the user is unfamiliar with calligraphy, the effect of writing by the hand on the smart device is not good. Handwriting automatic processing technology can eliminate the jagged or stepped appearance of the handwriting written by the hand, and at the same time, it has the stroke effect, provides users with a smoother, rounder, flowing and more natural writing experience.

At least one embodiment of the present disclosure provides a handwriting processing method, which comprises: acquiring a handwriting point group corresponding to a stroke on a working surface of a touch device, the handwriting point group comprising a plurality of handwriting points arranged in sequence, and data of each handwriting point in the plurality of handwriting points comprising a coordinate and an action type; determining a plurality of model patterns corresponding to the plurality of handwriting points based on coordinates and action types of the plurality of handwriting points; and sequentially connecting the plurality of model patterns corresponding to the plurality of handwriting points, to determine a handwriting track, which is used for displaying, corresponding to the handwriting point group.

Some embodiments of the present disclosure also provide a handwriting processing device and a non-transitory storage medium corresponding to the above handwriting processing method.

According to the handwriting processing method provided by the embodiments of the present disclosure, the handwriting point group may be acquired based on the stroke written by the user on the working surface of the touch device, and the handwriting track corresponding to the handwriting point group may be processed pointedly and displayed according to the coordinates and action types of respective handwriting points in the handwriting point group. The handwriting processing method can realize the effect of real-time handwriting processing without pressure, and at the same time, enable the handwriting track used for displaying have the stroke effect. The handwriting processing method also has advantages, such as, fast calculation speed, simple implementation principle, good real-time, etc., and can be widely used in scenes requiring the writing input by the hand, such as an electronic interactive whiteboard (e.g., a conference whiteboard, a teaching whiteboard, etc.), an electronic bulletin board, an airport digital signature wall, a cloud book, a handwriting board, etc.

Some embodiments and examples of the present disclosure will be described in detail below with reference to the accompanying drawings. It should be understood that the specific embodiments described herein are only used to illustrate and explain the present disclosure, and are not used to limit the present disclosure.

FIG. 1 is a schematic flow chart of a handwriting processing method provided by at least one embodiment of the present disclosure. For example, the handwriting processing method is applied to a computing device, the computing device includes any electronic device with a computing function, such as a mobile phone, a notebook computer, a tablet computer, a desktop computer, a server, etc., which is not limited by the embodiments of the present disclosure. For example, the computing device has a Central Processing Unit (CPU) or a Graphics Processing Unit (GPU), and further includes a memory. The memory is, for example, a non-volatile memory (such as Read Only Memory (ROM)) on which codes of an operating system is stored. For example, the memory also stores codes or instructions. By running these codes or instructions, the handwriting processing method provided by the embodiment of the present disclosure can be realized.

For example, the computing device may also include a touch device, such as a touch screen or a touch panel, to acquire an initial handwriting formed on the working surface of the touch device when the user writes. The touch screen can not only receive the initial handwriting, but also display the initial handwriting at the same time. Users may write directly on the working surface of the touch screen with their fingers, or write on the working surface of the touch screen with an active stylus or a passive stylus, which is not limited by the embodiments of the present disclosure. Here, the working surface refers to a surface for detecting the user's touch operation, such as the touch surface of the touch screen. It should be noted that in the embodiment of the present disclosure, the type of the touch device is not limited, the touch device may be not only the touch screen, but also any devices with the touch function, such as an interactive whiteboard, etc., and the type of the touch device may be determined according to actual requirements.

For example, as shown in FIG. 1, the handwriting processing method includes the following steps S100 to S300.

S100: acquiring a handwriting point group corresponding to a stroke on a working surface of a touch device, the handwriting point group comprising a plurality of handwriting points arranged in sequence, and data of each handwriting point in the plurality of handwriting points comprising a coordinate and an action type.

For example, in some embodiments, when the user writes a stroke on the working surface of the touch device, a pen-down action corresponds to the beginning of the stroke writing process, a pen-up action corresponds to the end of the stroke writing process, and there is a pen-move action between the pen-down action and the pen-up action, the pen-move action corresponds to the continuation of the stroke writing process; and when a user completes a complete stroke writing process, the writing track of the user on the working surface of the touch device corresponds to a stroke.

For example, the above stroke may have any shape. For example, the above stroke may be a stroke of Chinese character or a stroke of foreign character (e.g., English, Japanese, Korean, etc.).

Figure 2:
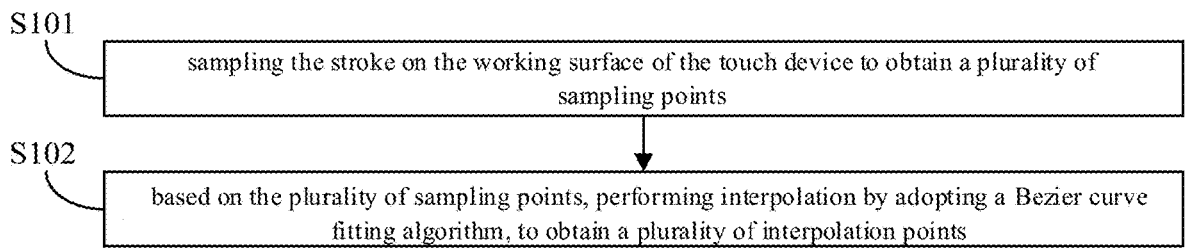
FIG. 2 is a schematic flow chart of a method for acquiring handwriting point groups provided by at least one embodiment of the present disclosure.
Figure 3:
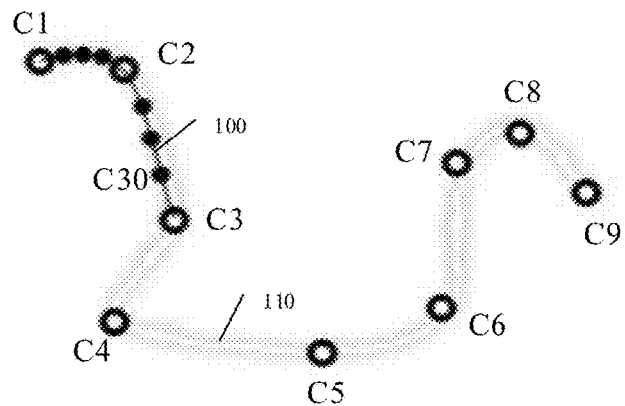
FIG. 3 is a schematic diagram of a handwriting point group provided by at least one embodiment of the present disclosure.

FIG. 2 is a schematic flow chart of a method for acquiring a handwriting point group provided by at least one embodiment of the present disclosure. FIG. 3 is a schematic diagram of a handwriting point group provided by at least one embodiment of the present disclosure. The method of acquiring the handwriting point group as shown in FIG. 2 will be described in detail below with reference to FIG. 3.

For example, as shown in FIG. 2, acquiring the handwriting point group corresponding to the stroke on the working surface of the touch device, that is, step S100, may include the following steps S101 to S102.

S101, sampling the stroke on the working surface of the touch device to obtain a plurality of sampling points;

S102: based on the plurality of sampling points, performing interpolation by adopting a Bezier curve fitting algorithm, to obtain a plurality of interpolation points.

For example, in some embodiments, the touch device itself may perform the above steps S101 to S102 based on a hardware (e.g., a touch circuit, a sampling circuit, etc.) and a software (e.g., related program algorithm), etc. The present disclosure includes but is not limited to this case.

For example, in some embodiments, the touch device may sample the stroke written by the user on the working surface according to a predetermined time sequence, to obtain the coordinates of a plurality of sampling points arranged in sequence (arranged according to the order of sampling). For example, the stroke may be sampled by a sparse sampling manner, to obtain a plurality of sampling points, and an amount of the plurality of sampling points may be determined according to the actual situation. For example, as shown in FIG. 3, by sampling the stroke 110 on the working surface of the touch device in real time (for example, sampling at intervals with the same duration), the coordinates of nine sampling points C1-C9 arranged in sequence (as shown by a hollow black circles in FIG. 3) may be obtained.

For example, in some embodiments, the touch device may also determine the action types of respective sampling points according to event-driven rules. For example, as shown in FIG. 3, an action type of the sampling point C1 corresponding to the pen-down action may be determined as the writing-beginning type according to the pen-down action (i.e. a pen-down event); according to the pen-up action (i.e. pen-up event), an action type of the sampling point C9 corresponding to the pen-up action may be determined as the writing-ending type; the sampling points C2-C8 between the sampling point C1 and the sampling point C9 correspond to the pen-move action, and the action types of the sampling points C2-C8 may be determined as the pen-move type. For example, in the case where the handwriting processing method of the above embodiment is implemented in an Android operating system, for an input event (MotionEvent) of the touch device, ACTION_DOWN represents the pen-down event; ACTION_MOVE indicates the pen-move event; ACTION_UP indicates a pen-up event.

For example, in some embodiments, as shown in FIG. 3, nine sampling points C1-C9 may divide the stroke 110 into four track segments, which are a first track segment corresponding to the sampling points C1-C3, a second track segment corresponding to the sampling points C3-C5, a third track segment corresponding to the sampling points C5-C7 and a fourth track segment corresponding to the sampling points C7-C9. The first track segment, the second track segment, the third track segment and the fourth track segment are arranged in sequence in an extending direction of the stroke 110 (that is, a direction from the sampling point C1 to the sampling point C9). The first track segment and the second track segment are adjacent and both correspond to the same sampling point C3, the second track segment and the third track segment are adjacent and both correspond to the same sampling point C5, and the third track segment and the fourth track segment are adjacent and both correspond to the same sampling point C7.

For example, based on the three sampling points corresponding to each track segment, the Bezier curve fitting algorithm may be used for performing interpolation, to obtain six interpolation points, then the handwriting point group corresponding to the track segment may be obtained, and the handwriting point group includes nine track points (i.e. three sampling points and six interpolation points). For example, in the handwriting point group, the nine track points are arranged in sequence according to the extending direction of the stroke. Taking the three sampling points C1-C3 corresponding to the first track segment as an example, the Bezier curve fitting algorithm is used to interpolate to obtain six interpolation points, which means fitting a second-order Bezier curve (as shown by the solid black line in FIG. 3) based on the three sampling points C1-C3, and three interpolation points in the curve segment between the sampling point C1 and the sampling point C2 and three interpolation points in the curve segment between the sampling point C2 and the sampling point C3 are taken to obtain coordinates of six interpolation points (as shown by the solid black dots C30 in FIG. 3), thereby a handwriting point group corresponding to the sampling points C1 to C3 (that is, a handwriting point group corresponding to the first track segment) can be obtained. By analogy, a handwriting point group corresponding to the second track segment, a handwriting point group corresponding to the third track segment and a handwriting point group corresponding to the fourth track segment may be obtained respectively. For example, in each handwriting point group, it is also possible to determine the action type of the track point, which is essentially an interpolation point, as the pen-move type.

For example, in the embodiment shown in FIG. 3, the stroke 110 correspond to several (four) handwriting point groups, in which an action type of a first handwriting point of a first handwriting point group is a writing-beginning type, an action type of a last handwriting point of a last handwriting point group is a writing-ending type, and action types of other handwriting points are the pen-move type. For example, in some examples, the data of each handwriting point may include a type identifier for marking the action type of the handwriting point; for example, in the case where the type identifier is 1, the action type of the handwriting point is the writing-beginning type; in the case where the type identifier is 2, the action type of the handwriting point is the pen-move type; in the case where the type identifier is 3, the action type of the handwriting point is the writing-ending type. For example, in other examples, in order to save storage space and reduce data transmission amount, in the case that the stroke 110 corresponds to the plurality of handwriting point groups, each handwriting point group may be made to correspond to one type identifier; for example, in the case where the type identifier corresponding to the handwriting point group is 1, the action type of the first handwriting point of the handwriting point group is the writing-beginning type, and action types of other handwriting points of the handwriting point group are the pen-move types by default; in the case where the type identifier corresponding to the handwriting point group is 2, the action type of each handwriting point of the handwriting point group is the pen-move type by default; in the case where the type identifier corresponding to the handwriting point group is 3, the action type of the last handwriting point of the handwriting point group is the writing-ending type, and the action types of other handwriting points of the handwriting point group are the pen-move types by default. For example, in the case where the type identifier corresponding to the handwriting point group is 1, the action type of each handwriting point in the handwriting point group is the writing-beginning type; in the case where the type identifier corresponding to the handwriting point group is 2, the action type of each handwriting point in the handwriting point group is the pen-move type; in the case where the type identifier corresponding to the handwriting point group is 3, the action type of each handwriting point in the handwriting point group is the writing-ending type.

It should be noted that the embodiment as shown in FIG. 3 is exemplary. Although the embodiment as shown in FIG. 3 only shows a case where one stroke corresponds to a plurality of handwriting point groups, it should not be regarded as a limitation of the present disclosure. For example, in some embodiments, one stroke may only correspond to one handwriting point group; in this case, the action type of the first handwriting point of the handwriting point group is the writing-beginning type, the action type of the last handwriting point of the handwriting point group is the writing-ending type, and the action types of other handwriting points of the handwriting point group are the pen-move types by default.

It should also be noted that the handwriting point group includes interpolation points obtained by interpolating using the Bezier curve fitting algorithm, which can enable the handwriting track for subsequent displaying smoother and more beautiful. However, in the embodiment of the present disclosure, the Bezier curve fitting algorithm is not limited to the case of fitting the second-order Bezier curve. For example, in some embodiments, each track segment of the stroke may correspond to 4 sampling points, in which case, interpolation points may be obtained by fitting a third-order Bezier curve.

Of course, in some embodiments, the handwriting point group may only include a plurality of sampling points, but not interpolation points. The present disclosure does not limit this case.

It should be noted that the present disclosure does not limit the acquisition method of the handwriting point group, as long as the data of handwriting point group can be obtained. For example, in some embodiments, the handwriting processing method provided by the embodiments of the present disclosure may be executed by the handwriting processing device, and the data of the handwriting point group may be received from the outside by the handwriting processing device.

S200: determining a plurality of model patterns corresponding to the plurality of handwriting points based on coordinates and action types of the plurality of handwriting points, the plurality of model patterns being in one-to-one correspondence with the plurality of handwriting points.

For example, in step S200, the shape of the model pattern may be preset, for example, the shape of the model pattern may include a circle and an ellipse (for example, a ratio of a short axis to a long axis of the ellipse is preset), but the shape of the model pattern is not limited to this case. Although the embodiment of the present disclosure is mainly explained by taking the circular model pattern as an example, it should not be regarded as a limitation of the present disclosure.

For example, in some embodiments, determining the plurality of model patterns corresponding to the plurality of handwriting points based on the coordinates and action types of the plurality of handwriting points may include an operation P201: in response to an action type of a first handwriting point among the plurality of handwriting points being the writing-beginning type, according to, in a writing application, a corresponding basic line width in a writing process and a coordinate of the first handwriting point, determining a size and a central coordinate of a model pattern corresponding to the first handwriting point. For example, taking the stroke 110 as shown in FIG. 3 as an example, the model pattern of the first handwriting point C1 corresponding to the first track segment of the stroke 110 may be determined based on the operation P201.

For example, in some examples, the basic line width is a line width of the writing track. The basic line width is set to a certain default value in the writing program; for example, in other examples, the basic line width has a plurality of selectable values in the writing program, and the user may select one of the plurality of selectable values as the basic line width as needed; for example, in some other examples, the writing program only sets a value range of the basic line width, and the user may set the basic line width within this value range. The disclosed embodiments do not limit in this aspect.

For example, in some examples, the shape of the model pattern is circle, and the size of the model pattern may be represented by a radius of the circle; for example, the radius of the circular model pattern corresponding to the first handwriting point may be set to ½ of the basic line width. For example, in other examples, the shape of the model pattern is an ellipse, and the size of the model pattern may be represented by a semi-short axis of the ellipse (that is, a half of the short axis); for example, the semi-short axis of the elliptical model pattern corresponding to the first handwriting point may be set to ½ of the basic line width.

For example, a coordinate system 0xy1 may be constructed by taking an upper left corner of a touch region of the touch device (that is, a region where an user can write) as an origin 0, a direction extending towards the right as an x-axis (a value of x increases in the right direction), and a direction extending downward as a y-axis (a value of y increases in the downward direction). The coordinate of each track point in the handwriting point group is the coordinate of each track point in the coordinate system 0xy1. For example, similarly, a coordinate system 0xy2 may be constructed by taking an upper left corner of a display region of the display device (for example, configured to display the handwriting track for subsequent displaying) as the origin 0, a direction extending towards the right as the x-axis (the value of x increases in the right direction), and the direction extending downward as the y-axis (the value of y increases in the downward direction), as long as the coordinate of each handwriting point (the coordinate relative to the coordinate system 0xy1) are mapped into the coordinate system 0xy2, a central coordinate of a model pattern corresponding to each handwriting point in the coordinate system 0xy2 may be obtained. For example, in some examples, the touch region of the touch device has the same shape and size as the display region of the display device. In this case, the coordinates of each handwriting point may be directly used as the central coordinate of the model pattern corresponding to each handwriting point. Therefore, the central coordinate of the model pattern corresponding to any handwriting point may be determined according to the coordinate of any handwriting point (including but not limited to the first handwriting point), which will not be described in detail later.

For example, in some embodiments, determining the plurality of model patterns corresponding to the plurality of handwriting points based on the coordinates and action types of the plurality of handwriting points may further include an operation P202: in response to the action type of the first handwriting point among a plurality of handwriting points being the writing-beginning type, determining a writing-beginning stroke type corresponding to the handwriting point group, based on the writing-beginning stroke type and the model pattern corresponding to the first handwriting point, determining a size and a central coordinate of an auxiliary model pattern corresponding to the first handwriting point, and based on the model pattern and the auxiliary model pattern corresponding to the first handwriting point, determining an auxiliary quadrangle corresponding to the first handwriting point, the auxiliary quadrangle corresponding to the first handwriting point being used for connecting the model pattern and the auxiliary model pattern, which correspond to the first handwriting point. For example, taking the stroke 110 shown in FIG. 3 as an example, based on the operation P201 and the operation P202, the pattern of the first handwriting point C1 corresponding to the first track segment of the stroke 110 may be set as a water drop unit, so that the writing-beginning effect of a brush stroke can be simulated.

For example, in some examples, determining the writing-beginning stroke type corresponding to the handwriting point group may include: determining a t-th handwriting point among the plurality of handwriting points of the handwriting point group, wherein t is a positive integer, t≠1, and a coordinate of the t-th handwriting point is different from the coordinate of the first handwriting point; and based on the coordinate of the first handwriting point and the coordinate of the t-th handwriting point, determining the writing-beginning stroke type corresponding to the handwriting point group.

For example, in some examples, t may be set to 2 in advance. If the coordinate of a second handwriting point is different from the coordinate of the first handwriting point, the writing-beginning stroke type corresponding to the handwriting point group is determined based on the coordinate of the first handwriting point and the coordinate of the second handwriting point. If the coordinates of the second handwriting point are the same as the coordinates of the first handwriting point, t is set to 3, 4, . . . , M in turn (M is an amount of the handwriting points in the handwriting point group) until the coordinate of the t-th handwriting point is different from the coordinate of the first handwriting point, and then the writing-beginning stroke type corresponding to the handwriting point group is determined based on the coordinate of the first handwriting point and the coordinate of the t-th handwriting point. For example, in other examples, t may be set to M, M−1, . . . , 2 in turn until the coordinate of the t-th handwriting point is different from the coordinate of the first handwriting point, and then based on the coordinate of the first handwriting point and the coordinate of the t-th handwriting point, the writing-beginning stroke type corresponding to the handwriting point group is determined. It should be noted that the embodiment of the present disclosure does not limit the way of determining the t-th handwriting point, as long as the coordinate of the t-th handwriting point is different from the coordinate of the first handwriting point.

For example, in some examples, if the coordinate of the first handwriting point is (x1, y1), the coordinate of the t-th handwriting point is (x2, y2), dx=x2−x1, dy=y2−y1, then based on the coordinate of the first handwriting point and the coordinate of the t-th handwriting point, determining the writing-beginning stroke type corresponding to the handwriting point group, comprises:

in response to dx=0 and dy≠0, determining the writing-beginning stroke type corresponding to the handwriting point group is a horizontal stroke;

in response to dx≠0 and dy=0, determining that the writing-beginning stroke type corresponding to the handwriting point group is a vertical stroke, in response to dx≠0 and dy≠0:

in a case where dx>0 and 0≤|dy/dx|≤0.27, determining that the writing-beginning stroke type corresponding to the handwriting point group is a horizontal stroke, in a case where dy>0 and 0≤|dx/dy|≤0.27, determining that the writing-beginning stroke type corresponding to the handwriting point group is a vertical stroke, in a case where dx<0, dy>0 and 0.27≤|dy/dx|≤3.73, determining that the writing-beginning stroke type corresponding to the handwriting point group is a left-falling stroke in Chinese characters, in a case where dx>0, dy>0 and 0.27≤|dy/dx|≤3.73, determining that the writing-beginning stroke type corresponding to the handwriting point group is a right-falling stroke in Chinese characters, in a case where dx>0, dy<0 and 0.27≤|dy/dx|≤3.73, determining that the writing-beginning stroke type corresponding to the handwriting point group is a rising stroke in Chinese characters, and in a case where dx<0 and dy<0, determining that the writing-beginning stroke type corresponding to the handwriting point group is other types.

For example, in some examples, after determining the writing-beginning stroke type corresponding to the handwriting point group, based on the writing-beginning stroke type and the model pattern corresponding to the first handwriting point, determining the size and central coordinate of the auxiliary model pattern corresponding to the first handwriting point, comprises:

in a case where the writing-beginning stroke type is the horizontal stroke, setting the size and central coordinate of the auxiliary model pattern so that r=R/2, $O_1O_2$=w/2, α=57°~63° (for example, α=60°, but is not limited to this case);

in a case where the writing-beginning stroke type is the vertical stroke, setting the size and central coordinate of the auxiliary model pattern to so that r=R/1.5, $O_1O_2$=w/1.5, α=67°~73° (for example, α=70°, but is not limited to this case);

in a case where the writing-beginning stroke type is the left-falling stroke in Chinese characters or the rising stroke in Chinese characters, setting the size and central coordinate of the auxiliary model pattern so that r=R/2, $O_1O_2$=w/2, =α=42°~48° (for example, α=45°, but is not limited to this case);

in a case where the writing-beginning stroke type is the right-falling stroke in Chinese characters or the other types, setting the size and central coordinate of the auxiliary model pattern so that r=R/1.5, $O_1O_2$=w/1.5, α=7°~13° (for example, α=10°, but is not limited to this case), where R represents the size of the model pattern corresponding to the first handwriting point, $O_1$ represents a center of the model pattern corresponding to the first handwriting point, r represents the size of the auxiliary model pattern corresponding to the first handwriting point, $O_2$ represents a center of the auxiliary model pattern corresponding to the first handwriting point, $O_1O_2$ represents a distance of a central connection line between the model pattern and the auxiliary model pattern, which correspond to the first handwriting point, and w represents the basic line width, a represents an included angle between the central connection line and a horizontal line (that is, a circle angle which is needed when the central connection line is rotated counterclockwise to a center angle of the horizontal line).

Figure 4:
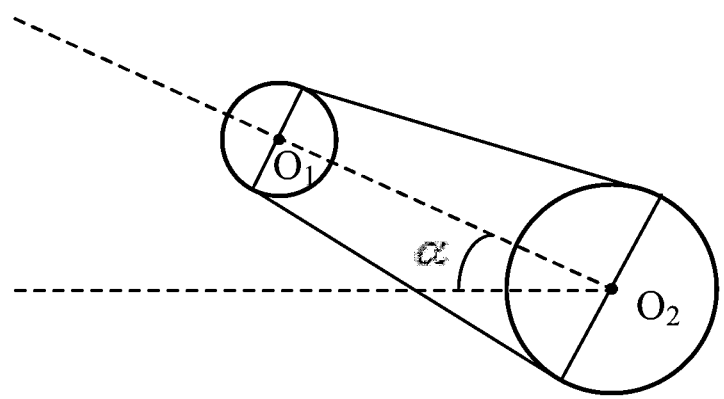
FIG. 4 is a schematic diagram of a water drop unit provided by at least one embodiment of the present disclosure.

FIG. 4 is a schematic diagram of a water drop unit provided by at least one embodiment of the present disclosure. For example, in some examples, as shown in FIG. 4, both the model pattern and the auxiliary model pattern corresponding to the first handwriting point are circular, R represents a radius of the circular model pattern corresponding to the first handwriting point, $O_1$ represents the center of the circular model pattern corresponding to the first handwriting point, r represents a radius of the circular auxiliary model pattern corresponding to the first handwriting point, $O_2$ represents the center of the circular auxiliary model pattern corresponding to the first handwriting point, $O_1O_2$ represents a distance of the center connection line between the model pattern and the auxiliary model pattern, which correspond to the first handwriting point, and a represents the angle between the center connection line and the horizontal line (that is, a circle angle which is needed when the central connection line is rotated counterclockwise to a center angle of the horizontal line).

For example, as shown in FIG. 4, in some examples, in the case where both the model pattern and the auxiliary model pattern corresponding to the first handwriting point are circular, based on the model pattern and the auxiliary model pattern corresponding to the first handwriting point, determining the auxiliary quadrilateral corresponding to the first handwriting point may include: determining four outer common tangent points of the circular model pattern and the circular auxiliary model pattern corresponding to the first handwriting point, and sequentially connecting the four outer common tangent points to form the auxiliary quadrilateral corresponding to the first handwriting point. For example, as shown in FIG. 4, the auxiliary quadrilateral is used to connect the model pattern and the auxiliary model pattern, which correspond to the first handwriting point, to form a connected pattern. For example, in the case where the model pattern and the auxiliary model pattern corresponding to the first handwriting point are both circular, the auxiliary quadrilateral formed by four outer common tangent points can be used to connect the model pattern and the auxiliary model pattern, which is beneficial to eliminate jaggies and burrs.

For example, in other examples, in the case that both the model pattern and the auxiliary model pattern corresponding to the first handwriting point are circular, based on the model pattern and the auxiliary model pattern corresponding to the first handwriting point, determining the auxiliary quadrilateral corresponding to the first handwriting point may include: determining a first diameter of the circular model pattern which is perpendicular to a connection line between a circle center of the circular model pattern and a circle center of the circular auxiliary model pattern, determining a second diameter of the circular auxiliary model pattern which is perpendicular to the connection line between the circle center of the circular model pattern and the circle center of the circular auxiliary model pattern, and taking two endpoints of the first diameter and two endpoints of the second diameter as four vertices of the auxiliary quadrilateral to determine the auxiliary quadrilateral. This scheme is conducive to reducing the calculation amount and improving the processing speed of handwriting processing method.

It should be noted that the water drop unit as shown in FIG. 4 is exemplary and should not be regarded as a limitation of the present disclosure. For example, in some examples, both the model pattern and the auxiliary model pattern corresponding to the first handwriting point may be elliptical, in such case, determining the auxiliary quadrilateral corresponding to the first handwriting point based on the model pattern and the auxiliary model pattern corresponding to the first handwriting point may include: determining four outer common tangent points of the elliptical model pattern and the elliptical auxiliary model pattern corresponding to the first handwriting point, and sequentially connecting the four outer common tangent points to form the auxiliary quadrilateral corresponding to the first handwriting point.

For example, in some embodiments, determining the plurality of model patterns corresponding to the plurality of handwriting points based on the coordinates and action types of the plurality of handwriting point may further include an operation P203: in response to the action type of the first handwriting point being the writing-beginning type, according to the basic line width and a coordinate of a second handwriting point among the plurality of handwriting points, determining a size and a central coordinate of a model pattern corresponding to the second handwriting point. For example, the first handwriting point and the second handwriting point are adjacent in a stroke extension direction. For example, taking the stroke 110 as shown in FIG. 3 as an example, a model pattern of the second handwriting point corresponding to the first track segment of the stroke 110 may be determined based on the operation P203.

For example, in some examples, in the case where the model pattern is circular, a radius of a circular model pattern corresponding to the second handwriting point may be set to ½ of the basic line width. For example, in other examples, in the case where the model pattern is elliptical, a semi-short axis of the elliptical model pattern corresponding to the second handwriting point may be set to ½ of the basic line width. That is, in response to the action type of the first handwriting point being the writing-beginning type, the size of the model pattern corresponding to the second handwriting point may be the same as the size of the model pattern corresponding to the first handwriting point. Embodiments of the present disclosure include but are not limited to this case.

For example, in some embodiments, determining the plurality of model patterns corresponding to the plurality of handwriting points based on the coordinates and action types of the plurality of handwriting points may further include an operation P204: starting from an i-th handwriting point among the plurality of handwriting points, determining a first distance d1 between the i-th handwriting point and an (i−1)-th handwriting point and a second distance d2 between the (i−1)-th handwriting point and an (i−2)-th handwriting point, and according to the basic line width w, a size $R_{i-1}$ of a model pattern corresponding to the (i−1)-th handwriting point, the first distance d1 and the second distance d2, determining the size $R_i$ of the model pattern corresponding to the i-th handwriting point; and determining a central coordinate of a model pattern corresponding to the i-th handwriting point according to a coordinate of the i-th handwriting point, where i is a positive integer, and i≥3. For example, taking the stroke 110 as shown in FIG. 3 as an example, based on the operation P204, model patterns of the other handwriting points except the first handwriting point and the second handwriting point corresponding to the first track segment of the stroke 110 may be determined. For example, in the operation P204, the size of the model pattern corresponding to the handwriting points may be adjusted according to the change of the distance between adjacent handwriting points, so that the pen-move effect of the brush stroke can be simulated.

For example, in some examples, the first distance d1 may be calculated according to the coordinate of the i-th handwriting point and the coordinate of the (i−1)-th handwriting point, and the second distance d2 may be calculated according to the coordinate of the (i−1)-th handwriting point and the coordinate of the (i−2)-th handwriting point.

For example, in some examples, taking the circular or elliptical model pattern as an example, determining the size $R_i$ of the model pattern corresponding to the (i−1)-th handwriting point according to the basic line width w, the size $R_{i-1}$ of the model pattern corresponding to the (i−1)-th handwriting point, the first distance d1 and the second distance d2 may include:

in response to d2−d1>w/2, if $R_{i-1} \leq 0.25w$, then $R_i = R_{i-1}$, otherwise, $R_i = t1 * R_{i-1}$;
in response to d2−d1<−p, if $R_{i-1} \geq 0.75w$, then $R_i = R_{i-1}$, otherwise, $R_i = t2 * R_{i-1}$;
in response to −p≤d2−d1≤w/2, $R_i = R_{i-1}$,
where the value of t1, the value of t2 and the value of p are preset, and t1<1, t2>1, and p is a positive number.

For example, t1, t2 and P may be set according to actual needs. For example, the value range of t1 may be set to [0.7, 0.9], and the embodiments of the present disclosure include but are not limited to this case. For example, t1 may be 0.8. For example, the value range of t2 may be set to [1.1, 1.3], and the embodiments of the present disclosure include but are not limited to this case. For example, t2 may be 1.2. For example, the value range of p may be set to [w/3, w/2]. For example, p may be w/2.

For example, in some embodiments, determining the plurality of model patterns corresponding to the plurality of handwriting points based on the coordinates and the action types of the plurality of handwriting points may further include an operation P211: in response to an action type of the first handwriting point among the plurality of handwriting points being a pen-move type, according to a previous handwriting point group of the handwriting point group, determining the size of the model pattern corresponding to the first handwriting point among the plurality of handwriting points and the size of the model pattern corresponding to the second handwriting point among the plurality of handwriting points, determining the central coordinate of the model pattern corresponding to the first handwriting point according to the coordinate of the first handwriting point, and determining the central coordinate of the model pattern corresponding to the second handwriting point according to the coordinate of the second handwriting point. For example, taking the stroke 110 as shown in FIG. 3 as an example, based on the operation P211, the model pattern corresponding to the first handwriting point and the second handwriting point of any track segment in a group consisting of the second track segment, the third track segment and the fourth track segment of the stroke 110 may be determined.

For example, in some examples, according to a previous handwriting point group of the handwriting point group, determining the size of the model pattern corresponding to the first handwriting point among the plurality of handwriting points and the size of the model pattern corresponding to the second handwriting point among the plurality of handwriting points includes an operation 2210: in response to a coordinate of an N-th handwriting point of the previous handwriting point group being identical to the coordinate of the first handwriting point of the handwriting point group, taking a size of a model pattern corresponding to the N-th handwriting point of the previous handwriting point group as the size of the model pattern corresponding to the first handwriting point of the handwriting point group, and determining a third distance between the second handwriting point and the first handwriting point of the handwriting point group and a fourth distance between the N-th handwriting point and an (N−1)-th handwriting point of the previous handwriting point group, and according to the basic line width, the size of the model pattern corresponding to the first handwriting point of the handwriting point group, the third distance and the fourth distance, determining the size of the model pattern corresponding to the second handwriting point of the handwriting point group; and the N-th handwriting point and the (N−1)-th handwriting point of the previous handwriting point group are the last two handwriting points of the previous handwriting point group.

For example, the handwriting point group and the previous handwriting point group are two adjacent handwriting point groups, the handwriting point group corresponding to the second track segment of the stroke 110 shown in FIG. 3 is the current handwriting point group, the handwriting point group corresponding to the first track segment is the previous handwriting point group, and the first handwriting point of the handwriting point group corresponding to the second track segment is coincident with the last handwriting point of the handwriting point group corresponding to the first track segment (that is, the coordinates are the same), so that the size of the model pattern corresponding to the last handwriting point of the first track segment may be directly taken as the size of the model pattern corresponding to the first handwriting point of the second track segment, and the corresponding calculation process is omitted. It should be understood that the stroke 110 is divided into a plurality of track segments in order to improve the real-time performance of handwriting processing method, and the second track segment is essentially the continuation of the pen-move action of the first track segment, so the size of the model pattern of each handwriting point except the first handwriting point corresponding to the second track segment may be determined by referring to the related description of the aforementioned operation P204. That is, in the operation 2210, the size of the model pattern corresponding to the second handwriting point of the handwriting point group may be determined by referring to the related description of the operation P204 mentioned above, which will not be repeated herein again.

That is, based on the operation P204, the model patterns of the other handwriting points except the first handwriting point and the second handwriting point corresponding to each track segment of the stroke 110 may be determined.

In the research, the inventor of the present application noticed that the writing-ending effect of the brush stroke is related to the writing-beginning stroke type of the stroke; for example, the writing-beginning stroke type include a horizontal stroke, a vertical stroke, a left-falling stroke in Chinese characters, a right-falling stroke in Chinese characters, a rising stroke in Chinese characters, and other types. For example, in the case where the writing-beginning of the stroke is a horizontal stroke or a right-falling stroke in Chinese characters, the tail of the stroke usually widens gradually, showing a "blunt" effect; and in the case where the writing-beginning of the stroke is a vertical stoke, a left-falling stroke in Chinese characters or a rising stroke in Chinese characters, the tail of the stroke usually narrows gradually, showing a "sharp" effect.

For example, in some embodiments, in order to simulate the brush stroke effect, determining the plurality of model patterns corresponding to the plurality of handwriting points based on the coordinates and action types of the plurality of handwriting points may further include an operation P221: in response to an action type of an M-th handwriting point among the plurality of handwriting points being a writing-ending type, determining the writing-beginning stroke type corresponding to the handwriting point group, and according to the writing-beginning stroke type, setting sizes of respective model patterns corresponding to an (M−j)-th handwriting point to the M-th handwriting point in the plurality of handwriting points, where j is a positive integer and j≥1. It should be understood that, in the case that the action type of the M-th handwriting point among the plurality of handwriting points of the handwriting point group is the writing-ending type, the size of each model pattern corresponding to the first handwriting point to an (M−j−1)-th handwriting point of the handwriting point group may still be determined through the aforementioned operations P201 to P204, P211 (including the operation P2210), etc.

For example, in some examples, in the case where the stroke corresponds to the plurality of handwriting point groups, the current handwriting point group is the last handwriting point group among the plurality of handwriting point groups, so the first handwriting point group among the plurality of handwriting point groups may be determined retrospectively; because the writing-beginning stroke type of the first handwriting point group has been determined (refer to the related description of the aforementioned operation P202), the writing-beginning stroke type of the first handwriting point group may be taken as the writing-beginning stroke type corresponding to the current handwriting point group. For example, in other examples, in the case where the stroke corresponds to one handwriting point group, the writing-beginning stroke type of the current handwriting point group has been determined in the aforementioned operation P202, so it may be directly obtained based on the result of the aforementioned operation P202.

Figure 5:
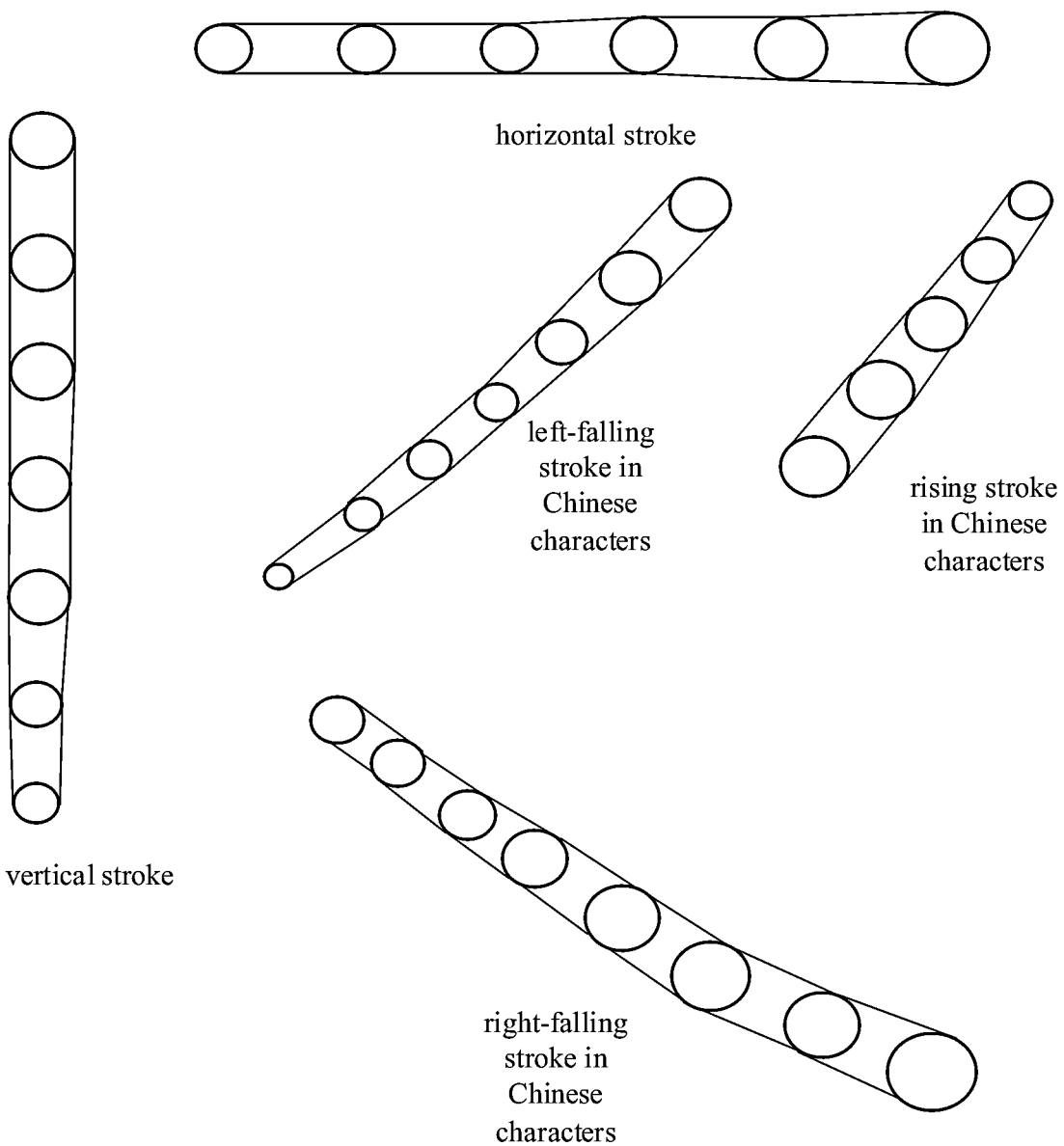
FIG. 5 is a schematic diagram of simulating a stroke-finishing effect of a brush stroke provided by at least one embodiment of the present disclosure.

FIG. 5 is a schematic diagram of a writing-ending effect simulating the brush stroke provided by at least one embodiment of the present disclosure. For example, in some embodiments, as shown in FIG. 5, according to the writing-beginning stroke type, setting sizes of respective model patterns corresponding to the (M−j)-th handwriting point to the M-th handwriting point among the plurality of handwriting points may include: in the case where the writing-beginning stroke type is the horizontal stroke or the right-falling stroke in Chinese characters, sequentially increasing the sizes of the respective model patterns corresponding to the (M−j)-th handwriting point to the M-th handwriting point according to a first preset proportion; and in the case where the writing-beginning stroke type is the vertical stroke, the left-falling stroke in Chinese characters or the rising stroke in Chinese characters, sequentially reducing the sizes of the respective model patterns corresponding to the (M−j)-th handwriting point to the M-th handwriting point according to a second preset proportion.

For example, in some examples, setting sizes of respective model patterns corresponding to the (M−j)-th handwriting point to the M-th handwriting point among the plurality of handwriting points according to the writing-beginning stroke type may further include: in the case where the writing-beginning stroke type is other type, the sizes of the respective model patterns corresponding to the (M−j)-th handwriting point to the M-th handwriting point among the plurality of handwriting points is not set according to the writing-beginning stroke type. That is, in the case where the writing-beginning stroke type is other type, the sizes of the respective model patterns corresponding to the (M−j)-th handwriting point to the M-th handwriting point among the plurality of handwriting points may be determined with reference to the aforementioned operation P204. Of course, embodiments of the present disclosure include but are not limited to this case. For example, in other examples, if the writing-beginning stroke type is another type, the sizes of the model patterns corresponding to the (M−j)-th handwriting point to the M-th handwriting point may be increased sequentially according to the first preset proportion, or the sizes of the model patterns corresponding to the (M−j)-th handwriting point to the M-th handwriting point may be decreased sequentially according to the second preset proportion.

For example, the first preset proportion may be set according to actual needs, as long as the sizes of the respective model patterns corresponding to the (M−j)-th handwriting point to the M-th handwriting point are ensured to be increased sequentially; for example, the second preset proportion may be set according to actual needs, as long as the sizes of respective model patterns corresponding to the (M−j)-th handwriting point to the M-th handwriting point are ensured to be decreased sequentially. For example, in some examples, the setting of the first preset proportion can prevent the size of the model pattern corresponding to the M-th handwriting point from being too large, and the setting of the second preset proportion can prevent the size of the model pattern corresponding to the M-th handwriting point from being too small.

It should be understood that the first preset proportion or the second preset proportion corresponding to different writing-beginning stroke types may be different or the same, which is not limited by the embodiments of the present disclosure. It should also be understood that j corresponding to different writing-beginning stroke types may be the same or different, and this is not limited by the embodiments of the present disclosure. For example, in some embodiments, j may be 2.

For example, as shown in FIG. 5, based on the operation P221, the writing-ending effect of the brush stroke of the horizontal stroke, the vertical stroke, the left-falling stroke in Chinese characters, the right-falling stroke in Chinese characters and the rising stroke in Chinese characters may be simulated.

S300: sequentially connecting the plurality of model patterns, to determine a handwriting track for displaying corresponding to the handwriting point group.

For example, taking the case that the model pattern corresponding to each handwriting point of the handwriting point group comprises a circle or an ellipse as an example, sequentially connecting the plurality of model patterns, to determine a handwriting track for displaying corresponding to the handwriting point group, that is, step S300, may include the operation P301: sequentially connecting four outer common tangent points of model patterns corresponding to every two adjacent handwriting points among the plurality of handwriting points, to form a quadrangle between the every two adjacent handwriting points, wherein the quadrangle between the every two adjacent handwriting points is used for connecting the model patterns corresponding to the every two adjacent handwriting points.

Figure 6:
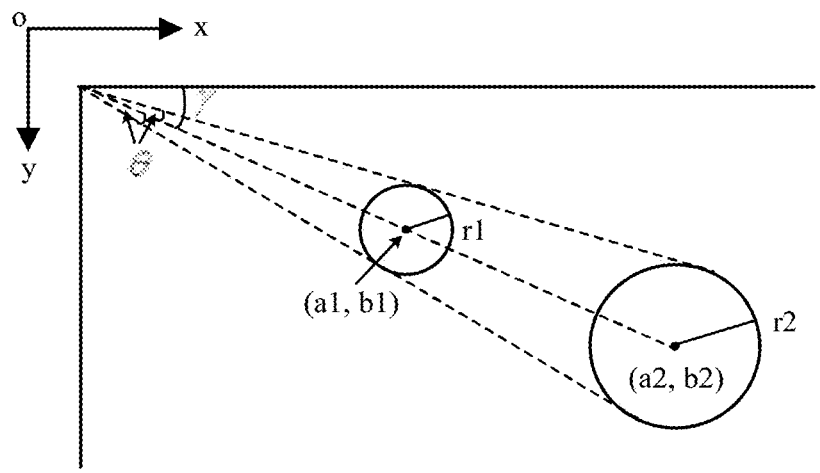
FIG. 6 is a schematic diagram of calculating an outer common tangent point provided by at least one embodiment of the present disclosure.

The following is a brief introduction of calculating the exact outer common tangent point between any two circles. FIG. 6 is a schematic diagram of calculating the outer common tangent point provided by at least one embodiment of the present disclosure. For example, as shown in FIG. 6, in the coordinate system oxy, assuming that the arbitrary two circles are a first circle and a second circle respectively, a central coordinate of the first circle is (a1, b1), a radius of the first circle is r1, a central coordinate of the second circle is (a2, b2), and a radius of the second circle is r2, then the coordinates of four outer common tangent points are determined based on the following classified discussions.

(1) In the case of r1=r2:
if a1=a2 and b1≠b2, the coordinates of the four outer common tangent points are respectively:
(a1−r1, b1), (a2−r2, b2), (a2+r2, b2), (a1+r1, b1);
if a1≠a2 and b1=b2, the coordinates of the four outer common tangent points are respectively:
(a1, b1−r1), (a2, b2−y2), (a2, b2+y2), (a1, b1+r1);
if a1≠a2 and b1≠b2, then
1) in the case where (b2−b1)/(a2−a1)>0, the coordinates of the four outer common tangent points are respectively:
(a1+r1 sin γ, b1−r1 cos γ), (a2+r2 sin γ, b2−r2 cos γ),
(a2−r2 sin γ, b2+r2 cos γ), (a1−r1 sin γ, b1+r1 cos γ),
2) in the case where (b2−b1)/(a2−a1)<0, the coordinates of the four outer common tangent points are respectively:
(a1−r1 sin γ, b1−r1 cos γ), (a2−r2 sin γ, b2−r2 cos γ),
(a2+r2 sin γ, b2+r2 cos γ), (a1+r1 sin γ, b1+r1 cos γ),
where $$\gamma = \arctan\left(\left|\frac{b2-b1}{a2-a1}\right|\right), a2 \neq a1,$$

γ represents an acute angle between a connection line of the circle center of the first circle and the circle center of the second circle and an abscissa axis (refer to FIG. 6).

(2) In the case where r1<r2:
if a1=a2 and b1≠b2, the coordinates of the four outer common tangent points are respectively:
(a1−r1 cos θ, b1−r1 sin θ), (a2−r2 cos θ, b2−r2 sin θ),
(a2+r2 cos θ, b2−r2 sin θ), (a1+r1 cos θ, b1−r1 sin θ)
if a1≠a2 and b1=b2, the coordinates of the four outer common tangent points are respectively:
(a1−r1 sin θ, b1−r1 cos θ), (a2−r2 sin θ, b2−r2 cos θ),
(a2+r2 sin θ, b2+r2 cos θ), (a1+r1 sin θ, b1−r1 cos θ),
if a1≠a2 and b1≠b2, then
1) in the case where a1<a2 and b1<b2, the coordinates of the four outer common tangent points are respectively:
(a1+r1 sin φ, b1−r1 cos φ), (a2+r2 sin φ, b2−r2 cos φ),
(a2−r2 sin φ, b2+r2 cos φ), (a1−r1 sin φ, b1+r1 cos φ),
2) in the case where a1>a2 and b1<b2, the coordinates of the four outer common tangent points are respectively:
(a1−r1 sin φ, b1−r1 cos φ), (a2−r2 sin φ, b2−r2 cos φ),
(a2+r2 sin φ, b2+r2 cos φ), (a1+r1 sin φ, b1+r1 cos φ),
3) in the case where a1>a2 and b1>b2, the coordinates of the four outer common tangent points are respectively:
(a1+r1 cos φ, b1−r1 sin φ), (a2+r2 cos φ, b2−r2 sin φ),
(a2−r2 cos φ, b2+r2 sin φ), (a1−r1 cos φ, b1+r1 sin φ),
4) in the case where a1<a2 and b1>b2, the coordinates of the four outer common tangent points are respectively:
(a1−r1 cos φ, b1−r1 sin φ), (a2−r2 cos φ, b2−r2 sin φ),
(a2+r2 cos φ, b2+r2 sin φ), (a1+r1 cos φ, b1+r1 sin φ);
where $$\theta = \arccos\left(\frac{r2-r1}{\sqrt{(a2-a1)^2+(b2-b1)^2}}\right),$$

θ represents an acute angle between a connection line of the circle center of the first circle and the circle center of the second circle and any outer common tangent (refer to FIG. 6), $$\gamma = \arctan\left(\left|\frac{b2-b1}{a2-a1}\right|\right), a2 \neq a1,$$

γ represents an acute angle between a connection line of the circle center of the first circle and the circle center of the second circle and the abscissa axis,
φ=γ−θ,ϕ=γ+θ.

(3) In the case where r1>r2:
if a1=a2 and b1≠b2, the coordinates of the four outer common tangent points are respectively:
(a1−r1 cos θ, b1+r1 sin θ), (a2−r2 cos θ, b2+r2 sin θ),
(a2+r2 cos θ, b2+r2 sin θ), (a1+r1 cos θ, b1+r1 sin θ);
if a1≠a2 and b1=b2, the coordinates of the four outer common tangent points are respectively:
(a1+r1 sin θ, b1−r1 cos θ), (a2+r2 sin θ, b2−r2 cos θ),
(a2−r2 sin θ, b2+r2 cos θ), (a1−r1 sin θ, b1+r1 cos θ);
if a1≠a2 and b1≠b2, then
1) in the case where a1<a2 and b1<b2, the coordinates of the four outer common tangent points are respectively:
(a1+r1 cos φ, b1−r1 sin φ), (a2+r2 cos φ, b2−r2 sin φ),
(a2−r2 cos φ, b2+r2 sin φ), (a1−r1 cos φ, b1+r1 sin φ),
2) in the case where a1>a2 and b1<b2, the coordinates of the four outer common tangent points are respectively:
(a1−r1 cos φ, b1−r1 sin φ), (a2−r2 cos φ, b2−r2 sin φ),
(a2+r2 cos φ, b2+r2 sin φ), (a1+r1 cos φ, b1+r1 sin φ),
3) in the case where a1>a2 and b1>b2, the coordinates of the four outer common tangent points are respectively:
(a1+r1 sin φ, b1−r1 cos φ), (a2+r2 sin φ, b2−r2 cos φ),
(a2−r2 sin φ, b2+r2 cos φ), (a1−r1 sin φ, b1+r1 cos φ),
4) in the case where a1<a2 and b1>b2, the coordinates of the four outer common tangent points are respectively:
(a1−r1 sin φ, b1−r1 cos φ), (a2−r2 sin φ, b2−r2 cos φ),
(a2+r2 sin φ, b2+r2 cos φ), (a1+r1 sin φ, b1+r1 cos φ);
where $$\theta = \arccos\left(\frac{r2-r1}{\sqrt{(a2-a1)^2+(b2-b1)^2}}\right),$$

θ represents an acute angle between a connection line of the circle center of the first circle and the circle center of the second circle and any outer common tangent, $$\gamma = \arctan\left(\left|\frac{b2-b1}{a2-a1}\right|\right), a2 \neq a1,$$

γ represents the acute angle between the connection line of the circle center of the first circle and the circle center of the second circle and the abscissa axis.

$$\varphi=\gamma-\theta, \phi=\gamma+\theta.$$

In the case where the model pattern corresponding to each handwriting point of the handwriting point group is circular, the coordinates of four outer common tangent points of the model patterns corresponding to every two adjacent handwriting points may be obtained (that is, the four outer common tangent points are determined) based on the accurate calculation formula of outer common tangent points between any two circles as mentioned above, and the quadrilateral between every two adjacent handwriting points may be obtained by connecting the four outer common tangent points sequentially. The quadrangle is used to connect the model patterns corresponding to every two adjacent handwriting points, which is beneficial to eliminate jaggies and burrs and enables the finally obtained handwriting track for displaying smoother.

It should be understood that the coordinates of the four vertices of the above-mentioned auxiliary quadrilateral may also be calculated by using the above-mentioned calculation formula, the repetition will not be repeated herein again.

For example, in the case where the model pattern corresponding to each handwriting point of the handwriting point group includes an ellipse, four outer common tangent points of the elliptical model patterns corresponding to every two adjacent handwriting points may be calculated based on the knowledge of analytic geometry, to form a quadrangle between every two adjacent handwriting points, which will not be described in detail herein again.

For example, in other embodiments, in the case that the model pattern corresponding to each handwriting point of the handwriting point group includes a circle, a third diameter and a fourth diameter perpendicular to the connection line of the circle centers in the elliptical model patterns corresponding to every two adjacent handwriting points may be determined, wherein the third diameter is a diameter of one of the elliptical model patterns corresponding to every two adjacent handwriting points, and the fourth diameter is a diameter of the another elliptical model pattern corresponding to every two adjacent handwriting points; then, two endpoints of the third diameter and two endpoints of the fourth diameter are used as endpoints of the quadrilateral, to determine the quadrilateral between every two adjacent handwriting points. This scheme is conducive to reducing the calculation amount and improving the processing speed of handwriting processing method.

For example, the handwriting track for displaying obtained in step S300 may be displayed in real time by the display device. For example, in some embodiments, taking a case where a user writes the stroke 110 shown in FIG. 3 as an example, when the user finishes writing of the first track segment of the stroke 110, the display device can display the handwriting track for displaying corresponding to the first track segment in real time. At this time, the user may not have finished writing of the stroke 110 (for example, the user may be writing the second track segment of the stroke 110, etc.).

For example, in some embodiments, the handwriting processing method described above can provide an interesting interactive way for an airport display screen. As a landmark building in a city, the airport is an important way to attract tourists. The handwriting processing method provided by the present disclosure can be integrated into the display screen of the airport. When the tourists arrive at the airport of a certain city, they may write their signatures on the display screen and display them on the display screen in a form of processed brush handwriting. Tourists take photos with their signatures, forming a unique "punch-in" way to attract tourists and promote the development of urban tourism. In other embodiments, the handwriting processing method mentioned above can provide a new blackboard writing method for smart classrooms, which can process writing on the blackboard and blackboard writing fonts of students or teachers and give clearer presentation.

It should be understood that although the embodiments of the present disclosure are all explained by taking the case that a stroke type of the handwriting track for displaying is a brush stroke as an example, it should not be regarded as a limitation of the present disclosure. For example, the handwriting processing method provided by the embodiment of the present disclosure may also design more handwriting styles, such as pencil stroke, pen stroke, etc., to form more beautiful fonts without losing the original fonts.

Figure 7:
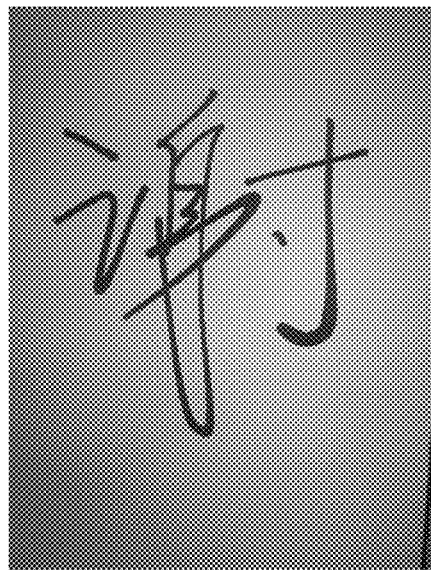
FIG. 7 is an effect diagram of simulating a brush stroke provided by at least one embodiment of the present disclosure.

FIG. 7 is an effect diagram of a simulated brush stroke provided by at least one embodiment of the present disclosure. For example, as shown in FIG. 7, a stroke type of the handwriting track for displaying is a brush stroke. The Chinese character "谢" as shown in FIG. 7 shows a good simulation effect of the brush stroke.

According to the handwriting processing method provided by the embodiments of the present disclosure, the handwriting point group may be acquired based on the stroke written by the user on the working surface of the touch device, and the handwriting track corresponding to the handwriting point group may be targetedly processed and displayed according to the coordinate and action type of each handwriting point group in the handwriting point group. The handwriting processing method can realize the effect of real-time handwriting processing without pressure, and at the same time, enable the handwriting track used for displaying to have the stroke-tip effect. The handwriting processing method also has the advantages, such as, fast calculation speed, simple implementation principle, good real-time, etc., and can be widely used in scenes requiring the writing input by the hand, such as an electronic interactive whiteboard (e.g., a conference whiteboard, a teaching whiteboard, etc.), an electronic bulletin board, an airport digital signature wall, a cloud book, a handwriting board, etc.

Figure 8:
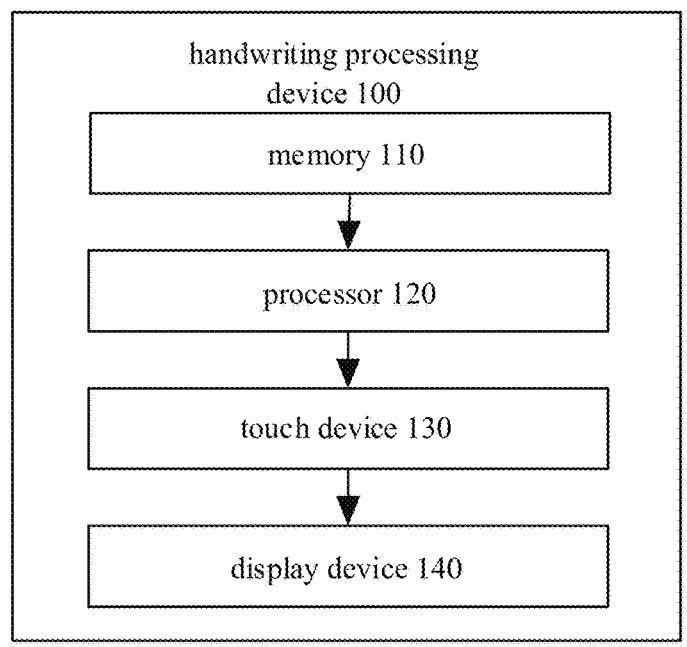
FIG. 8 is a schematic block diagram of a handwriting processing device provided by at least one embodiment of the present disclosure.

At least one embodiment of the present disclosure also provides a handwriting processing device, and FIG. 8 is a schematic block diagram of a handwriting processing device provided by at least one embodiment of the present disclosure.

For example, as shown in FIG. 8, the handwriting processing device 100 includes a memory 110 and a processor 120. It should be understood that the components of the handwriting processing device 100 shown in FIG. 8 are only exemplary and not restrictive, and the handwriting processing device 100 may have other components according to actual application requirements. For example, the handwriting processing device 100 may adopt Windows, Android and other operating systems, and the handwriting forming method according to the embodiment of the present disclosure is realized by an application program running in the operating system.

For example, the memory 110 is used to store computer-readable instructions in a non-transitory manner; the processor 120 is used to run the computer-readable instructions, in the case where the computer-readable instructions are run by the processor 120, one step or more steps in the handwriting processing method according to any of the above embodiments can be executed.

For example, as shown in FIG. 8, the handwriting processing device 100 may further include a touch device 130. The touch device 130 is configured to acquire handwriting point group corresponding to the stroke on the working surface of the touch device 130. For example, the touch device 130 may include any input device with touch function, such as an electronic pen, a touch screen, a mouse, a touch pad, an interactive whiteboard, etc. For example, the touch screen may be a capacitive touch screen, such as a self-capacitive touch screen or a mutual-capacitive touch screen, and may also be a resistive touch screen, a surface acoustic wave touch screen, an infrared touch screen, etc.

For example, the touch device 130 may include a touch sensor and a controller (such as a driver IC), the controller receives an electrical signal collected by the touch sensor, processes the electrical signal to obtain a touch signal and provides the touch signal to the processor and the like for further processing, so as to realize the handwriting processing method provided by the embodiment of the present disclosure. The type, structure and communication mode of the touch device 130 are not limited by the embodiments of the present disclosure. The touch device 130 includes a working surface with a certain area. Users can write directly on the working surface of the touch device 130 with their fingers, or write on the working surface of the touch device 130 with an active stylus or a passive stylus, which is not limited by the embodiment of the present disclosure. Here, the working surface refers to a surface for detecting a user's touch operation, such as the touch surface of the touch device 130.

For example, as shown in FIG. 8, the handwriting processing device 100 may further include a display device 140. The display device 140 is configured to display the handwriting track for displaying corresponding to the handwriting point group. For example, the display device 140 may include a display device, such as, a display screen, a projector, etc. The display screen of the display device 140 is, for example, a LCD display screen, an OLED display screen, a QLED display screen, a projection component, an VR head-mounted display device (such as an VR helmet, an VR glasses), a AR display device, etc. The embodiments of the present disclosure do not limit to this case. The display device 140 may display handwriting formed by the handwriting forming method provided by the embodiment of the present disclosure, such as a brush handwriting.

For example, in some embodiments, the touch device 130 and the display device 140 may be integrated into, for example, a touch display screen, thus having both a touch function and a display function.

For example, the memory 110 and the processor 120 may be integrated in the touch screen, or for example, the memory 110 and the processor 120 may also be integrated in the cloud server.

For example, the handwriting processing device 100 may further include a communication module for realizing communication between the handwriting processing device 100 and other electronic devices. For example, in the case where the handwriting processing device 100 is applied to the display screen of the airport, the communication module may transmit the displayed handwriting track from the display screen of the airport to the user's mobile phone or tablet computer, so that the user's mobile phone or tablet computer can store the displayed handwriting track.

For example, the processor 120 may control other components in the handwriting processing device 100 to perform desired functions. The processor 120 may be a central processing unit (CPU), a Tensor Processing Unit (TPU) and other devices with data processing capability and/or program execution capability. The central processing unit (CPU) may be X86 or ARM architecture, etc.

For example, the memory 110 may include any combination of one or more computer program products, which may include various forms of computer-readable storage medium, such as volatile memory and/or nonvolatile memory. The volatile memory may include, for example, random access memory (RAM) and/or cache. The nonvolatile memory may include, for example, read only memory (ROM), hard disk, erasable programmable read only memory (EPROM), portable compact disk read only memory (CD-ROM), USB memory, flash memory, etc., One or more computer-readable instructions may be stored on the computer-readable storage medium, and the processor 120 can run the computer-readable instructions to realize various functions of the handwriting processing device 100.

For example, the memory 110, the memory 120, the touch device 130 and the display device 140 can communicate with each other through the network. The network may include a wireless network, a wired network, and/or any combination of the wireless network and the wired network. The network may include a local area network, the Internet, a telecommunication network, the Internet of Things based on the Internet and/or the telecommunication network, and/or any combination of the above networks, etc. The wired network may communicate by a twisted pair, a coaxial cable or an optical fiber transmission, and the wireless network may communicate by using a 3G/4G/5G mobile communication network, a Bluetooth, a Zigbee or a WiFi. The types and functions of the network are not limited by the present disclosure.

For example, a detailed description of the process of handwriting processing performed by the handwriting processing device 100 may refer to the relevant descriptions in the embodiment of handwriting processing method, and the repetitions will not be repeated herein again.

Figure 9:
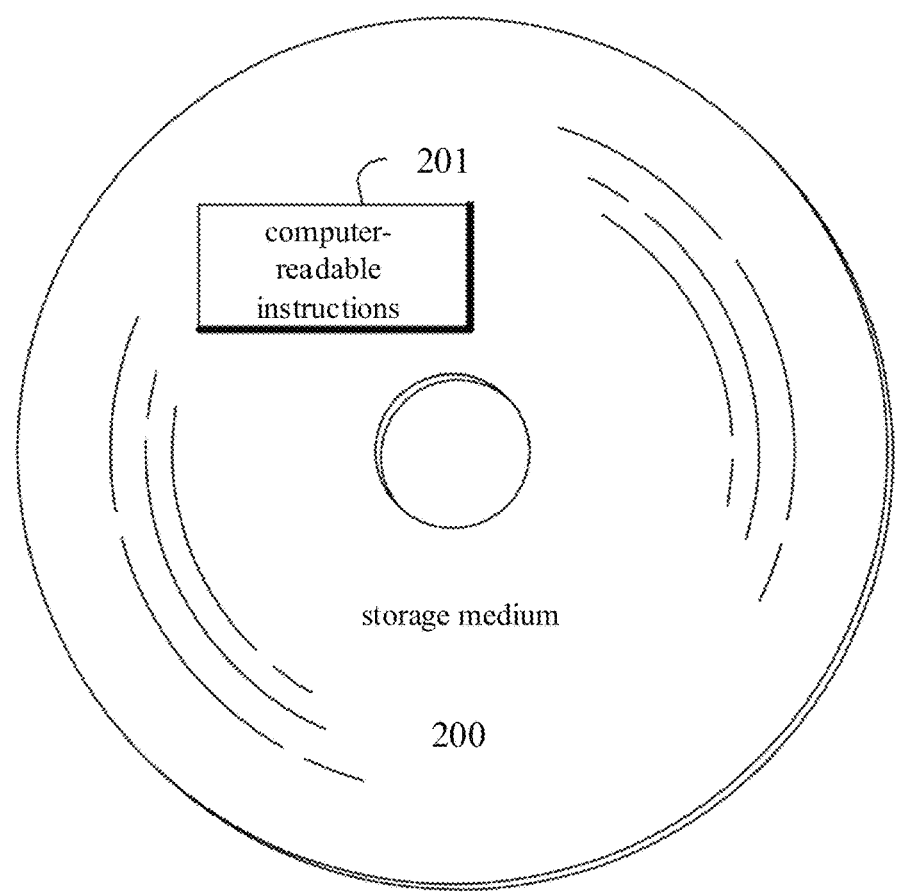
FIG. 9 is a schematic diagram of a storage medium provided by at least one embodiment of the present disclosure.

At least one embodiment of the present disclosure also provides a storage medium. FIG. 9 is a schematic diagram of a storage medium provided by at least one embodiment of the present disclosure. For example, as shown in FIG. 9, one or more computer-readable instructions 201 may be stored on the storage medium 200 in a non-transitory manner. For example, in the case where the computer-readable instructions 201 are executed by a computer, one or more steps in the handwriting processing method described above can be executed.

For example, the storage medium 200 may be applied to the handwriting processing device 100 described above, for example, the storage medium 200 may be used as the memory 110 in the handwriting processing device 100. The description of the storage medium 200 may refer to the description of the memory 100 in the embodiment of the handwriting processing device 100, and the repetition will not be repeated herein again.

Figure 10:
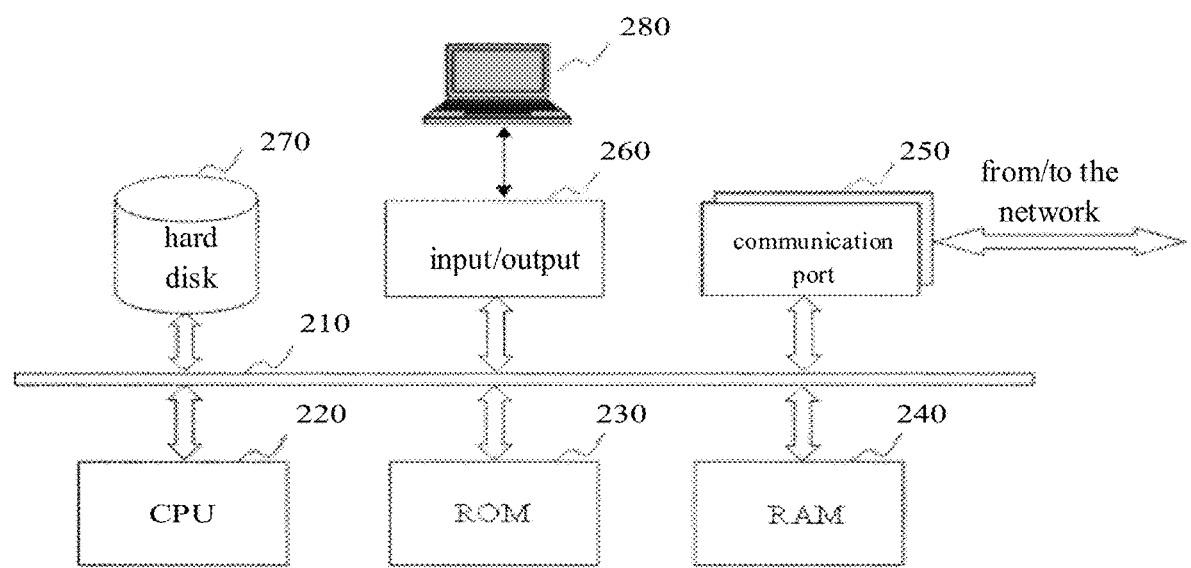
FIG. 10 is a schematic diagram of a hardware environment provided by at least one embodiment of the present disclosure.

FIG. 10 is a schematic diagram of a hardware environment provided by at least one embodiment of the present disclosure. The handwriting processing device 100 provided by the present disclosure may be applied to the Internet system.

The handwriting processing device 100 involved in the present disclosure may be realized by using the computer system provided in FIG. 10. Such computer systems may include a personal computer, a notebook computer, a tablet computer, a mobile phone, a personal digital assistant, a smart glasses, a smart watch, a smart ring, a smart helmet and any a smart portable device or a wearable device. The specific system in the embodiment uses the functional block diagram to explain a hardware platform comprising the user interface. This kind of computer device may be a general purpose computer device or a special purpose computer device. Two kinds of computer device may be used to realize the handwriting processing device 100 in this embodiment. The computer system may implement any components currently described to realize the information needed for handwriting processing. For example, a computer system may be realized by the computer device through a hardware device, a software program, a firmware and their combinations. For convenience, only one computer device is drawn in FIG. 10, but the computer functions related to the information needed for handwriting processing described in this embodiment may be implemented by a group of similar platforms in a distributed manner, thus dispersing the processing load of the computer system.

As shown in FIG. 10, the computer system may include a communication port 250, which is connected with a network for data communication. For example, the computer system may send and receive information and data through the communication port 250, that is, the communication port 250 can realize wireless or wired communication between the computer system and other electronic devices to exchange data. The computer system may also include a processor group 220 (i.e., the processor described above) for executing program instructions. The processor group 220 may be composed of at least one processor (e.g., CPU). The computer system may include one internal communication bus 210. The computer system may include different forms of program storage units and data storage units (i.e., memories or storage medium described above), such as the hard disk 270, the read-only memory (ROM) 230 and the random access memory (RAM) 240, which can be used to store various data files for computer processing and/or communication, and possible program instructions executed by the processor group 220. The computer system may also include one input/output component 260, which is used to realize the input/output data flow between the computer system and other components (e.g., an user interface 280, etc.).

Generally, the following devices may be connected to the input/output assembly 260: an input device including, for example, a touch screen, a touch pad, a keyboard, a mouse, a camera, a microphone, an accelerometer, a gyroscope, etc.; an output device including, for example, a liquid crystal display (LCD), a speaker, a vibrator, etc.; a storage device including, for example, a magnetic tape, a hard disk, etc.; and a communication interface.

Although FIG. 10 shows a computer system with various devices, it should be understood that the computer system is not required to have all the devices shown, and instead, the computer system may have more or fewer devices.

For the present disclosure, the following points need to be explained: (1) the drawings of the embodiments of the present disclosure only relate to the structures related to the embodiments of the present disclosure, and other structures may refer to the common design; (2) for clarity, in the drawings used to describe the embodiments of the present disclosure, the thickness and size of layers or structures are exaggerated, it can be understood that when an element such as a layer, film, region or substrate is described to be "above" or "below" another element, the element may be "directly" above or "below" another element, or there may be intervening elements; (3) without conflict, the embodiments of the present disclosure and the features in the embodiments can be combined with each other to obtain a new embodiment.

What are described above is related to the specific embodiments of the disclosure only and not limitative to the scope of the disclosure. The protection scope of the disclosure shall be based on the protection scope of the claims.

What is claimed is:

1. A handwriting processing method, comprising:
   acquiring a handwriting point group corresponding to a stroke on a working surface of a touch device, wherein the handwriting point group comprises a plurality of handwriting points arranged in sequence, and data of each handwriting point in the plurality of handwriting points comprises a coordinate and an action type;
   determining a plurality of model patterns corresponding to the plurality of handwriting points based on the coordinates and the action types of the plurality of handwriting points, wherein the plurality of model patterns are in one-to-one correspondence with the plurality of handwriting points; and
   sequentially connecting the plurality of model patterns, to determine a handwriting track for displaying corresponding to the handwriting point group.

2. The handwriting processing method according to claim 1, wherein the determining the plurality of model patterns corresponding to the plurality of handwriting points based on the coordinates and the action types of the plurality of handwriting points comprises:
   in response to an action type of a first handwriting point among the plurality of handwriting points being a writing-beginning type, according to a corresponding basic line width in a writing process and a coordinate of the first handwriting point in a writing application, determining a size and a central coordinate of a model pattern corresponding to the first handwriting point.

3. The handwriting processing method according to claim 2, wherein the determining the plurality of model patterns corresponding to the plurality of handwriting points based on the coordinates and the action types of the plurality of handwriting points further comprises:
   in response to the action type of the first handwriting point being the writing-beginning type, determining a writing-beginning stroke type corresponding to the handwriting point group,
   based on the writing-beginning stroke type and the model pattern corresponding to the first handwriting point, determining a size and a central coordinate of an auxiliary model pattern corresponding to the first handwriting point, and
   based on the model pattern and the auxiliary model pattern corresponding to the first handwriting point, determining an auxiliary quadrangle corresponding to the first handwriting point, wherein the auxiliary quadrangle corresponding to the first handwriting point is used for connecting the model pattern and the auxiliary model pattern corresponding to the first handwriting point.

4. The handwriting processing method according to claim 3, wherein the determining the writing-beginning stroke type corresponding to the handwriting point group comprises:
   determining a t-th handwriting point among the plurality of handwriting points, wherein t is a positive integer, t≠1, and a coordinate of the t-th handwriting point is different from the coordinate of the first handwriting point; and based on the coordinate of the first handwriting point and the coordinate of the t-th handwriting point, determining the writing-beginning stroke type corresponding to the handwriting point group.

5. The handwriting processing method according to claim 4, wherein the coordinate of the first handwriting point is (x1, y1), the coordinate of the t-th handwriting point is (x2, y2), dx=x2−x1, dy=y2−y1, based on the coordinate of the first handwriting point and the coordinate of the t-th handwriting point, determining the writing-beginning stroke type corresponding to the handwriting point group comprises:

in response to dx=0 and dy≠0, determining that the writing-beginning stroke type corresponding to the handwriting point group is a horizontal stroke, in response to dx≠0 and dy=0, determining that the writing-beginning stroke type corresponding to the handwriting point group is a vertical stroke, in response to dx≠0 and dy≠0:

in a case where dx>0 and 0≤|dy/dx|≤0.27, determining that the writing-beginning stroke type corresponding to the handwriting point group is a horizontal stroke, in a case where dy>0 and 0≤|dx/dy|≤0.27, determining that the writing-beginning stroke type corresponding to the handwriting point group is a vertical stroke, in a case where dx<0, dy>0 and 0.27<|dy/dx|≤3.73, determining that the writing-beginning stroke type corresponding to the handwriting point group is a left-falling stroke, in a case where dx>0, dy>0 and 0.27<|dy/dx|≤3.73, determining that the writing-beginning stroke type corresponding to the handwriting point group is a right-falling stroke, in a case where dx>0, dy<0 and 0.27<|dy/dx|≤3.73, determining that the writing-beginning stroke type corresponding to the handwriting point group is a rising stroke, and in a case where dx<0 and dy<0, determining that the writing-beginning stroke type corresponding to the handwriting point group is other types.

6. The handwriting processing method according to claim 5, wherein based on the writing-beginning stroke type and the model pattern corresponding to the first handwriting point, determining the size and the central coordinate of the auxiliary model pattern corresponding to the first handwriting point comprises:

in a case where the writing-beginning stroke type is the horizontal stroke, setting the size and the central coordinate of the auxiliary model pattern so that r=R/2, $O_1O_2$=w/2, α=57° ~63°;

in a case where the writing-beginning stroke type is the vertical stroke, setting the size and the central coordinate of the auxiliary model pattern so that r=R/1.5, $O_1O_2$=w/1.5, α=67° ~73°;

in a case where the writing-beginning stroke type is the left-falling stroke or the rising stroke, setting the size and the central coordinate of the auxiliary model pattern so that r=R/2, $O_1O_2$=w/2, =α=42° ~48°;

in a case where the writing-beginning stroke type is the right-falling stroke or the other types, setting the size and the central coordinate of the auxiliary model pattern so that r=R/1.5, $O_1O_2$=w/1.5, α=7°~13°, where R represents the size of the model pattern corresponding to the first handwriting point, $O_1$ represents a center of the model pattern corresponding to the first handwriting point, r represents the size of the auxiliary model pattern corresponding to the first handwriting point, $O_2$ represents a center of the auxiliary model pattern corresponding to the first handwriting point, $O_1O_2$ represents a distance of a central connection line between the model pattern and the auxiliary model pattern corresponding to the first handwriting point, and w represents a basic line width, α represents an included angle between the central connection line and a horizontal line.

7. The handwriting processing method according to claim 2, wherein the determining the plurality of model patterns corresponding to the plurality of handwriting points based on the coordinates and the action types of the plurality of handwriting points further comprises:

in response to the action type of the first handwriting point being a writing-beginning type, according to the basic line width and a coordinate of a second handwriting point among the plurality of handwriting points, determining a size and a central coordinate of a model pattern corresponding to the second handwriting point, wherein the first handwriting point is adjacent to the second handwriting point.

8. The handwriting processing method according to claim 7, wherein the determining the plurality of model patterns corresponding to the plurality of handwriting points based on the coordinates and the action types of the plurality of handwriting points further comprises:

starting from an i-th handwriting point among the plurality of handwriting points, determining a first distance between the i-th handwriting point and an (i−1)-th handwriting point and a second distance between the (i−1)-th handwriting point and an (i−2)-th handwriting point, and according to the basic line width, a size of a model pattern corresponding to the (i−1)-th handwriting point, the first distance and the second distance, determining the size of the model pattern corresponding to the i-th handwriting point; and determining a central coordinate of the model pattern corresponding to the i-th handwriting point according to a coordinate of the i-th handwriting point, where i is a positive integer, and i≥3.

9. The handwriting processing method according to claim 1, wherein the determining the plurality of model patterns corresponding to the plurality of handwriting points based on the coordinates and the action types of the plurality of handwriting points comprises:

in response to an action type of a first handwriting point among the plurality of handwriting points being a pen-move type, according to a previous handwriting point group of the handwriting point group, determining a size of a model pattern corresponding to the first handwriting point among the plurality of handwriting points and a size of a model pattern corresponding to a second handwriting point among the plurality of handwriting points, determining a central coordinate of the model pattern corresponding to the first handwriting point according to the coordinate of the first handwriting point, and determining a central coordinate of the model pattern corresponding to the second handwriting point according to the coordinate of the second handwriting point.

10. The handwriting processing method according to claim 9, wherein according to the previous handwriting point group of the handwriting point group, determining the size of the model pattern corresponding to the first handwriting point among the plurality of handwriting points and the size of the model pattern corresponding to the second handwriting point among the plurality of handwriting points comprises:

in response to a coordinate of an N-th handwriting point of the previous handwriting point group being identical to the coordinate of the first handwriting point of the handwriting point group, taking a size of a model pattern corresponding to the N-th handwriting point of the previous handwriting point group as the size of the model pattern corresponding to the first handwriting point of the handwriting point group, and determining a third distance between the second handwriting point and the first handwriting point of the handwriting point group and a fourth distance between the N-th handwriting point and an (N−1)-th handwriting point of the previous handwriting point group, and according to the basic line width, the size of the model pattern corresponding to the first handwriting point of the handwriting point group, the third distance and the fourth distance, determining the size of the model pattern corresponding to the second handwriting point of the handwriting point group, wherein the N-th handwriting point and the (N−1)-th handwriting point of the previous handwriting point group are last two handwriting points of the previous handwriting point group.

11. The handwriting processing method according to claim 1, wherein an M-th handwriting point of the plurality of handwriting points is a last handwriting point of the handwriting point group, determining the plurality of model patterns corresponding to the plurality of handwriting points based on the coordinates and the action types of the plurality of handwriting points comprises:

in response to an action type of the M-th handwriting point being a writing-ending type, determining a writing-beginning stroke type corresponding to the handwriting point group, and according to the writing-beginning stroke type, setting a size of each of a plurality of model patterns corresponding to an (M−j)-th handwriting point to the M-th handwriting point among the plurality of handwriting points, where j is a positive integer and j≥1.

12. The handwriting processing method according to claim 11, wherein the writing-beginning stroke type comprises a horizontal stroke, a vertical stroke, a left-falling stroke, a right-falling stroke, a rising stroke and other types, according to the writing-beginning stroke type, the setting the size of each of the plurality of model patterns corresponding to the (M−j)-th handwriting point to the M-th handwriting point among the plurality of handwriting points comprises:

in a case where the writing-beginning stroke type is the horizontal stroke or the right-falling stroke, sequentially increasing the sizes of the plurality of model patterns corresponding to the (M−j)-th handwriting point to the M-th handwriting point according to a first preset proportion;

in a case where the writing-beginning stroke type is the vertical stroke, the left-falling stroke or the rising stroke, sequentially reducing the sizes of the plurality of model patterns corresponding to the (M−j)-th handwriting point to the M-th handwriting point according to a second preset proportion; and in a case where the writing-beginning stroke type is other type, setting the sizes of the plurality of model patterns corresponding to the (M−j)-th handwriting point to the M-th handwriting point among the plurality of handwriting points not according to the writing-beginning stroke type.

13. The handwriting processing method according to claim 1, wherein the model pattern corresponding to each handwriting point of the handwriting point group comprises a circle or an ellipse, sequentially connecting the plurality of model patterns, to determine the handwriting track for displaying corresponding to the handwriting point group comprises:

sequentially connecting four outer common tangent points of model patterns corresponding to every two adjacent handwriting points among the plurality of handwriting points, to form a quadrangle between the every two adjacent handwriting points, wherein the quadrangle between the every two adjacent handwriting points is used for connecting the model patterns corresponding to the every two adjacent handwriting points.

14. The handwriting processing method according to claim 1, wherein the acquiring the handwriting point group corresponding to the stroke on the working surface of the touch device comprises:

sampling the stroke on the working surface of the touch device, to obtain a plurality of sampling points; and based on the plurality of sampling points, performing interpolation by adopting a Bezier curve fitting algorithm, to obtain a plurality of interpolation points, wherein the plurality of handwriting points of the handwriting point group comprise the plurality of sampling points and the plurality of interpolation points, and the action type of each sampling point in the plurality of sampling points is one of a set consisting of a writing-beginning type, a pen-move type and a writing-ending type.

15. The handwriting processing method according to claim 1, wherein the stroke corresponds to a plurality of handwriting point groups, an action type of a first handwriting point of a first handwriting point group in the plurality of handwriting point groups is a writing-beginning type, and an action type of a last handwriting point of a last handwriting point group in the plurality of handwriting point groups is a writing-ending type.

16. The handwriting processing method according to claim 1, wherein a stroke type of the handwriting track for displaying is a brush stroke.

17. A handwriting processing device, comprising:
a memory, storing computer-readable instructions in a non-transitory manner; and
a processor, running the computer-readable instructions, wherein in a case where the computer-readable instructions are run by the processor, the handwriting processing method according to claim 1 is executed.

18. The handwriting processing device according to claim 17, further comprising a touch device,
wherein the touch device is configured to acquire the handwriting point group corresponding to the stroke on the working surface of the touch device.

19. The handwriting processing device according to claim 17, further comprising a display device,
wherein the display device is configured to display the handwriting track for displaying corresponding to the handwriting point group.

20. A non-transitory storage medium, storing computer-readable instructions non-transiently, wherein in a case where the computer-readable instructions, which is stored non-transiently, are executed by a computer, instructions of the handwriting processing method according to claim 1 are executed.

* * * * *